(12) United States Patent
Shigeta

(10) Patent No.: US 10,942,426 B2
(45) Date of Patent: Mar. 9, 2021

(54) CAMERA, INTERCHANGEABLE LENS APPARATUS, ADAPTER APPARATUS, CONTROL METHOD, AND STORAGE MEDIUM

(71) Applicant: CANON KABUSHIKI KAISHA, Tokyo (JP)

(72) Inventor: Junji Shigeta, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/695,570

(22) Filed: Nov. 26, 2019

(65) Prior Publication Data

US 2020/0096839 A1  Mar. 26, 2020

Related U.S. Application Data

(63) Continuation of application No. PCT/JP2018/020714, filed on May 30, 2018.

(30) Foreign Application Priority Data

May 31, 2017 (JP) .............................. JP2017-107260
May 30, 2018 (JP) .............................. JP2018-102897

(51) Int. Cl.
*G03B 17/14* (2006.01)
*H04N 5/232* (2006.01)
*G03B 5/00* (2021.01)

(52) U.S. Cl.
CPC ............... *G03B 17/14* (2013.01); *G03B 5/00* (2013.01); *H04N 5/23212* (2013.01)

(58) Field of Classification Search
CPC ................................................. H04N 5/23209
See application file for complete search history.

(56) References Cited

U.S. PATENT DOCUMENTS 8,412,034 B2   4/2013   Okada
8,414,205 B2   4/2013   Okada
(Continued)

FOREIGN PATENT DOCUMENTS

EP    1672420 A1    6/2006
JP    S63118113 A   5/1988
(Continued)

OTHER PUBLICATIONS

International Preliminary Report on Patentability issued in Intl. Appln. No. PCT/JP2018/020714 dated Dec. 12, 2019. English translation provided.

(Continued)

*Primary Examiner* — Clayton E. LaBalle
*Assistant Examiner* — Leon W Rhodes, Jr.
(74) *Attorney, Agent, or Firm* — Rossi, Kimms & McDowell LLP

(57) ABSTRACT

A camera includes a lens-camera communication controller and an adapter-camera communication controller. The camera-lens communication channel includes a first data communication channel used during a data communication and a first notification channel used for a notification of a timing of a communication via the first data communication channel. The camera-adapter communication channel includes a second data communication channel used during the data communication and a second notification channel used for a notification of a timing of a communication via the second data communication channel.

20 Claims, 15 Drawing Sheets

(56) References Cited

U.S. PATENT DOCUMENTS

2013/0028590 A1 1/2013 Hasuda
2015/0116592 A1* 4/2015 Suzuki ............... H04N 5/23209
              348/375
2019/0306392 A1* 10/2019 Imamura ............ H04N 5/23209

FOREIGN PATENT DOCUMENTS

| JP | 06-027515 A | * | 2/1994 |
| JP | 07-234432 A | * | 9/1995 |
| JP | H07234432 A | | 9/1995 |
| JP | 2002072328 A | | 3/2002 |
| JP | 2002341424 A | | 11/2002 |
| JP | 2010226666 A | | 10/2010 |
| JP | 2012037692 A | | 2/2012 |
| JP | 2013232015 A | | 11/2013 |
| WO | 2017068894 A1 | | 4/2017 |

OTHER PUBLICATIONS

English translation of Written Opinion issued in Intl. Appln. No. PCT/JP2018/020714 dated Aug. 21, 2018 previously cited in an IDS on Nov. 26, 2019.
International Search Report issued in Intl. Appln. No. PCT/JP2018/020714 dated Aug. 21, 2018. English translation provided.
Written Opinion issued in Intl. Appln. No. PCT/JP2018/020714 dated Aug. 21, 2018.
Extended European Search Report issued in European Application No. 18810649.6 dated Jan. 21, 2021.

* cited by examiner

CAMERA, INTERCHANGEABLE LENS APPARATUS, ADAPTER APPARATUS, CONTROL METHOD, AND STORAGE MEDIUM

CROSS-REFERENCE TO RELATED APPLICATIONS

This application is a Continuation of International Patent Application No. PCT/JP2018/020714, filed on May 30, 2018, which claims the benefit of Japanese Patent Applications Nos. 2017-107260, filed on May 31, 2017, and 2018-102897, filed on May 30, 2018, each of which is hereby incorporated by reference herein in their entirety.

BACKGROUND OF THE INVENTION

Field of the Invention

The present invention relates to a camera system including a camera, an interchangeable lens apparatus (simply referred to as interchangeable lens hereinafter), and an adapter apparatus (simply referred to as an adapter hereinafter) located between the camera and the interchangeable lens, which can communicate with each other.

Description of the Related Art

In an interchangeable lens type camera system including a camera to which an interchangeable lens is detachably attachable, a communication is performed for the camera to control the operation of the interchangeable lens and for the interchangeable lens to provide the camera with data necessary for its control and imaging. In particular, in imaging a recording use motion image and a live-view display use motion image with the interchangeable lens, a smooth lens control is required at an imaging cycle, so it is necessary to synchronize the imaging timing of the camera and the control timing of the interchangeable lens with each other. Thus, the camera needs to complete a data reception from the interchangeable lens and a transmission of a command, such as a variety of instructions and requests, to the interchangeable lens within the imaging cycle. However, as a data amount received by the camera from the interchangeable lens becomes larger or the imaging cycle becomes shorter (or the frame rate becomes higher), a communication of a large amount of data at higher speed is required.

An adapter such as a wide converter or a teleconverter (extender) may be mounted between the camera and the interchangeable lens. In this case, a command transmission from the camera to the interchangeable lens and a data transmission from the interchangeable lens to the camera are performed via the adapter. Furthermore, for proper AF, AE, etc. in the camera, not only data on the interchangeable lens but also data specific to the adapter is required. A camera system disclosed in Japanese Patent Laid-Open No. 2012-037692 performs the command transmission from the camera to the adapter and the data transmission from the adapter to the camera by a common communication channel as that for the command transmission from the camera to the interchangeable lens and the data transmission from the interchangeable lens to the camera. In other words, a one-to-many communication is achieved among the camera, the interchangeable lens, and the adapter using one communication channel.

However, in the one-to-many communication using only a single communication channel, for example, the camera cannot transmit a command to the interchangeable lens or receive data from the interchangeable lens while data is transmitted from the adapter to the camera. As a result, an expedited communication between the camera and the interchangeable lens is hindered.

SUMMARY OF THE INVENTION

The present invention provides a camera, an interchangeable lens apparatus, and an adapter apparatus, each of which can expedite a communication between the camera and the interchangeable lens apparatus and smooth a communication between the camera and the adapter apparatus.

A camera according to one aspect of the present invention to which an interchangeable lens apparatus is connected via at least one adapter apparatus includes a lens-camera communication controller configured to communicate with the interchangeable lens apparatus via a camera-lens communication channel connected from the camera to the interchangeable lens apparatus via the adapter apparatus, and an adapter-camera communication controller configured to communicate with the adapter apparatus via a camera-adapter communication channel provided separately from the camera-lens communication channel with the adapter apparatus. The camera-lens communication channel includes a first data communication channel used during a data communication and a first notification channel used for a notification of a timing of a communication via the first data communication channel, and the camera-adapter communication channel includes a second data communication channel used during the data communication and a second notification channel used for a notification of a timing of a communication via the second data communication channel.

A camera system including the above camera, an interchangeable lens connected to the camera, and an adapter apparatus connected to the camera and the adapter apparatus also constitute another aspect of the present invention.

An adapter apparatus according to another aspect of the present invention to which the camera and interchangeable lens are connected includes a relay channel for forming part of a camera-lens communication channel used for a communication between the camera and the interchangeable lens, and an adapter-camera communication controller configured to communicate with the camera via a camera-adapter communication channel provided separately from the relay channel with the camera. The camera-lens communication channel includes a first data communication channel used during a data communication and a first notification channel used for a notification of a timing of a communication via the first data communication channel, and the camera-adapter communication channel includes a second data communication channel used during a data communication and a second notification channel used for a notification of a timing of a communication via the second data communication channel.

An interchangeable lens apparatus according to another aspect of the present invention connected to an adapter apparatus and a camera via the adapter apparatus includes a first lens-camera communication controller configured to communicate with the camera via a camera-lens communication channel connected to the interchangeable lens from the camera via the adapter apparatus, and a second lens-camera communication controller provided separately from the camera-lens communication channel and configured to communicate with the camera via a communication channel including a camera adapter communication channel connected to the camera and the adapter. The first camera-lens communication channel includes a first data communication channel used during a data communication and a first notification channel used for a notification of a timing of communication via the first data communication channel, and the communication channel includes the camera-adapter communication channel include a second data communication channel used during a data communication and a second notification channel used for a notification of a timing of a communication via the second data communication channel.

A control method for a camera connected to an interchangeable lens apparatus via at least one adapter apparatus includes the steps of communicating with the interchangeable lens apparatus via a camera-lens communication channel connected from the camera to the interchangeable lens apparatus via the adapter apparatus, and communicating with the adapter apparatus via a camera-adapter communication channel from a camera-lens communication channel with the adapter apparatus separate, and controlling an operation of the interchangeable lens using data obtained through a communication with the interchangeable lens apparatus, and controlling an operation of the adapter apparatus using data obtained through a communication with the adapter apparatus. The camera-lens communication channel includes a first data communication channel used during a data communication and a first notification channel used for a notification of a timing of a communication via the first data communication channel, and the camera-adapter communication channel includes a second data communication channel used during a data communication and a second notification channel used for a notification of a timing of communication via the second data communication channel.

The imaging control program as a computer program that executes the above control method also constitutes another aspect of the present invention.

Further features of the present invention will become apparent from the following description of exemplary embodiments with reference to the attached drawings.

DESCRIPTION OF THE EMBODIMENTS

Referring now to the accompanying drawings, a description will be given of embodiments according to the present invention.

First Embodiment

Figure 1:
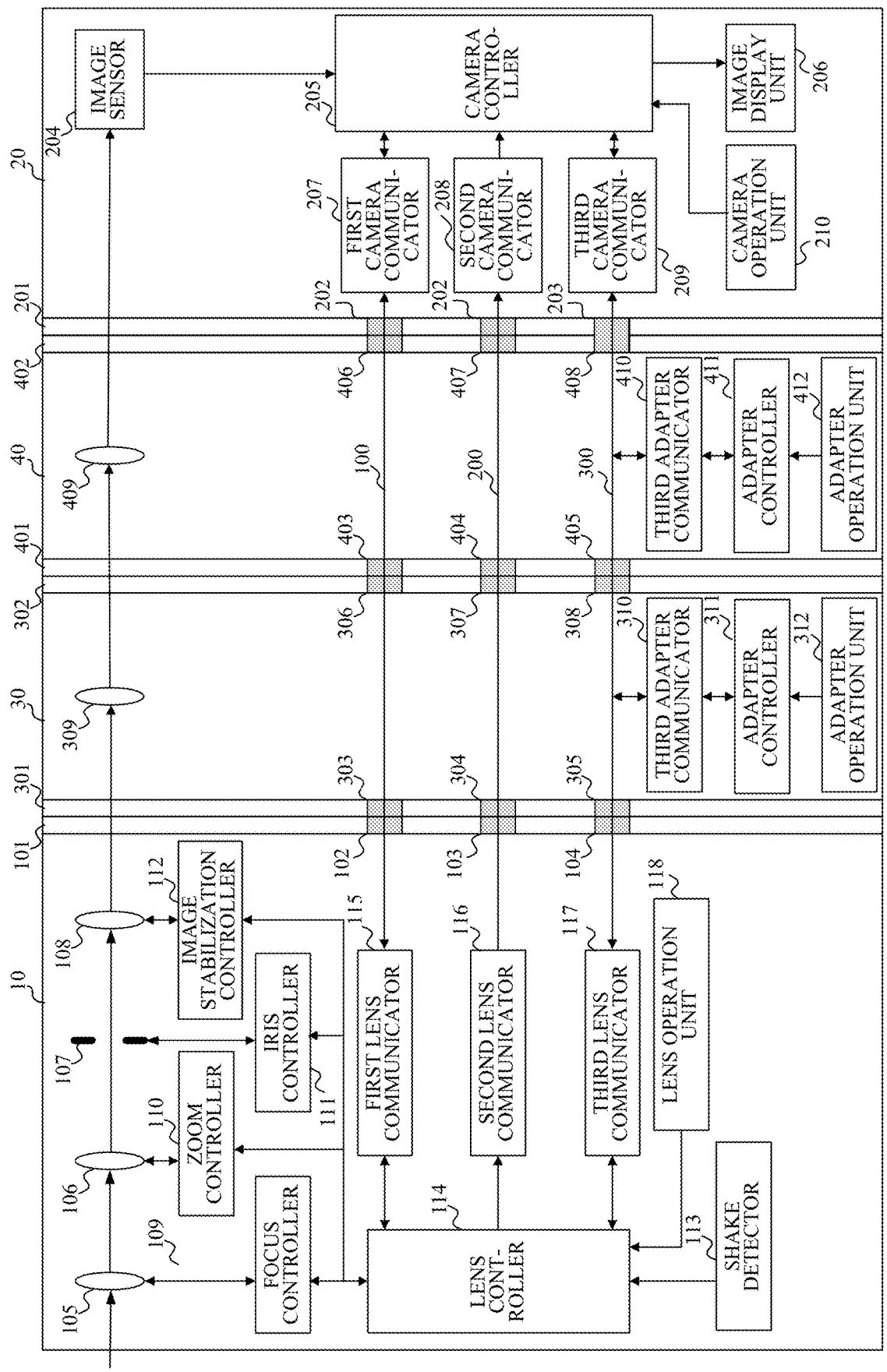
FIG. 1 is a block diagram showing a configuration of a camera system according to a first embodiment of the present invention.

FIG. 1 illustrates a configuration of a camera system according to a first embodiment of the present invention. The camera system includes a camera 20, an interchangeable lens apparatus (referred to as an interchangeable lens hereinafter) 10, and two adapter apparatuses (referred to as adapters hereinafter) 30 and 40 disposed between the camera 20 and the interchangeable lens 10. The camera system has a first communication use camera-lens communication channel 100 (referred to as a first communication channel 100 hereinafter) for transmitting a command for an instruction and a request from the camera 20 to the interchangeable lens 10. In addition, the camera system includes, separate from the communication channel 100, a second communication use lens-camera communication channel (referred to as a second communication channel 200 hereinafter) for transmitting data indicating optical data, status, and the like from the interchangeable lens 10 to the camera 20. The camera system further includes a third communication use camera-adapter communication channel (referred to as a third communication channel 300 hereinafter) for communicating data indicating a command, optical data of each adapter, and the state and the like between the camera 20 and the two adapters 30 and 40.

The interchangeable lens 10 has an imaging optical system including a plurality of movable optical elements such as a lens and an aperture stop or diaphragm (iris). The camera 20 includes an image sensor 204 that captures an object image formed by the imaging optical system, and generates an image signal using an output signal from the image sensor 204. The adapter 40 is detachably connected (attached) to the mount 201 of the camera 20 at a mount 402. The adapter 30 is detachably connected to a mount 401 of the adapter 40 at its mount 302. The adapter 30 includes an extender, a wide converter, or the like, and the adapter 40 includes an ND adapter or the like, and includes adapter optical elements 309 and 409 such as a magnification varying lens and an ND filter, respectively. Further, the interchangeable lens 10 is detachably connected to the mount 301 of the adapter 30 at its mount 101.

When the mounts 101, 301, 302, 401, 402, and 201 are all connected, first communication contacts 102, 303, 306, 403, 406, and 202 provided to the respective mounts are electrically connected to each other, and a camera-lens communication channel is formed for the first communication. The first communication is used for a communication used for the camera 20 to control the operation of the movable optical element of the interchangeable lens 10.

When the mounts 101, 301, 302, 401, 402, and 201 are all connected, second communication contacts 103, 304, 307, 404, 407, and 202 provided to the respective mounts are electrically connected to each other, and a camera-lens communication channel is formed for the second communication. The second communication is used to transmit optical data of the interchangeable lens 10 (referred to as lens optical data hereinafter) and data indicating the state of the interchangeable lens 10 (referred to as lens state data hereinafter) to the camera 20. Further, by connecting the mounts 101, 301, 302, 401, 402, and 201, third communication contacts 104, 305, 308, 405, 408, and 203 provided to the respective mounts are electrically connected to each other to form a camera-adapter communication channel for the third communication. The third communication is a one-to-many communication between the camera 20 and the two adapters 30 and 40. The third communication is used for the camera 20 to transmit a command for controlling their operations to the adapters 30 and 40. Further, it is used for the adapters 30 and 40 to transmit optical data to the camera 20 of adapter optical elements 309 and 409 and operation data indicating a user operation to the adapters 30 and 40. The following description will refer to the respective optical data of the adapters 30 and 40 as first adapter optical data and second adapter optical data. The respective operation data of the adapters 30 and 40 will be referred to as first adapter operation data and second adapter operation data. The third communication is also used for a communication between the interchangeable lens 10 and the adapters 30 and 40.

In the interchangeable lens 10, the movable optical elements in the imaging optical system described above include a focus lens 105, a magnification varying lens 106, an iris 107, and an image stabilization lens 108. The focus lens 105 moves in the optical axis direction of the imaging optical system to perform focusing. The magnification varying lens 106 moves in the optical axis direction to perform a magnification variation. The iris 107 performs a light amount adjustment. The image stabilization lens 108 moves (shifts) in a direction orthogonal to the optical axis direction to reduce an object image blur caused by a camera shake due to camera shake or the like.

A focus controller 109 includes a focus actuator that moves the focus lens 105, a focus driver that controls driving of the focus lens 105, and a focus position sensor that detects the position of the focus lens 105. A zoom controller 110 includes a zoom adapter that moves the magnification varying lens 106, a zoom driver that controls its driving, and a zoom position sensor that detects the position of the magnification varying lens 106. An iris controller 111 includes an iris driver that drives an iris motor provided to the iris 107 and an iris position sensor that detects an open/close position (F-number or aperture value) of the iris 107. An image stabilization controller 112 includes an image stabilization actuator that shifts the image stabilization lens 108, an image stabilization driver that controls its driving, and a shift position sensor that detects the shift position of the image stabilization lens 108.

A shake detection unit 113 includes a vibration gyro and the like, and detects a camera shake amount that is a shake amount of the interchangeable lens 10 (or a camera system).

A lens controller 114 controls the operations of the focus lens 105, the magnification varying lens 106, and the iris 107 through the focus, zoom, and iris controllers 109 to 111 in accordance with the lens control command received from a camera controller 205 in the camera 20. The lens controller 114 controls the operation (shift) of the image stabilization lens 108 through the image stabilization controller 112 in response to receiving the lens control command. The lens controller 114 transmits lens optical data and lens state data to the camera controller 205. The lens controller 114 communicates with the camera controller 205 through a first lens communicator 115 and a second lens communicator 116, and communicates with the adapters 30 and 40 through a third lens communicator 117.

The first lens communicator 115 constitutes a camera-lens communication controller together with the lens controller 114, and performs a first communication with the camera controller 205. The first communication is used to receive a command, such as a lens control command, from the camera controller 205.

The second lens communicator 116 performs a second communication with the camera controller 205. The second communication is used to transmit lens optical data and lens state data to the camera controller 205. The third lens communicator 117 constitutes an adapter-lens communication controller together with the lens controller 114, and performs a third communication with third adapter communicators 310 and 410 in the adapters 30 and 40. The third communication between the third adapter communicators 310 and 410 is also used to transmit lens optical data and lens state data from the lens controller 114 to the adapter controllers 311 and 411.

The lens controller 114 and the lens first to third communicators 115 to 117 include a computer such as a CPU provided in the interchangeable lens 10. A lens operation member 118 is an operation member operated by the user in the interchangeable lens 10, and includes a switch, an electronic ring, or the like.

In the camera 20, the image sensor 204 includes a CMOS image sensor or the like, and photoelectrically converts (captures) an object image. The camera controller 205 converts the output signal from the image sensor 204 into an image signal and outputs it to an image display unit 206.

In addition, the camera controller 205 transmits a lens control command to the lens controller 114 to control the operation of the interchangeable lens 10 and receives lens optical data and lens state data from the lens controller 114. The camera controller 205 communicates with the lens controller 114 through the first camera communicator 207 and the camera second communicator 208, and communicates with the adapters 30 and 40 through the third camera communicator 209.

The first camera communicator 207 constitutes a lens-camera communication controller together with the camera controller 205, and performs a first communication with the first lens communicator 115. As described above, the first communication is used to transmit a command such as a lens control command from the camera controller 205 to the lens controller 114, or to transmit data from the lens controller 114 to the camera controller 205. The camera second communicator 208 performs a second communication with the first lens communicator 115. As described above, the second communication is used to receive lens optical data and lens state data from the lens controller 114.

The third camera communicator 209 constitutes an adapter-camera communication controller together with the camera controller 205, and performs a third communication with the third adapter communicators 310 and 410. The third communication is used to transmit an adapter control command and an adapter transmission requesting command (a command for requesting a transmission of adapter specific information) to the adapter controllers 311 and 411. Moreover, the third communication is used to receive the adapter specific information from the adapter controllers 311 and 411. The adapter specific information includes, for example, first and second adapter optical data and first and second adapter operation data. The camera controller 205 and the camera first to third communicators 207 to 209 include a computer such as a CPU provided in the camera 20. In the first and third communications, at least one of a communication method, a communication timing, a communication speed (communication rate), and a communication voltage is different from each other.

The image display unit 206 includes a liquid crystal monitor or the like, and displays an image signal (captured image) from the camera controller 205. The camera operation member 210 is an operation member operated by the user in the camera 20 in order to set an imaging condition, and includes a dial, a switch, or the like.

In the adapters 30 and 40, the adapter optical elements 309 and 409 described above are optical elements for adding a specific optical action to the interchangeable lens 10, and include a magnification varying lens, an ND filter, or the like. In this embodiment, the adapter 30 is an extender having a magnification varying lens as the adapter optical element 309, and the adapter 40 is an ND adapter having an ND filter as the adapter optical element 409. The adapter optical element may be an member other than a magnification varying lens or an ND filter.

The adapter controllers 311 and 411 control the operations of the adapters 30 and 40 (insertion into and ejection from the imaging optical path of the magnification varying lens and the ND filter) according to the adapter control command received from the camera controller 205.

The adapter controllers 311 and 411 communicate with the camera controller 205 and the lens controller 114 via the third adapter communicators 310 and 410. The third adapter communicators 310 and 410 together with the adapter controllers 311 and 411 constitute a camera-adapter communication controller and a lens-adapter communication controller, and perform the third communication with the third camera communicator 209 and the third lens communicator 117. As described above, the third communication with the third camera communicator 209 is a communication used to receive the adapter control command and the adapter request command from the camera controller 205, and to transmit the first and second adapter optical data to the camera controller 205. As described above, the third communication with the third lens communicator 117 is used to receive lens optical data and lens state data from the lens controller 114.

The adapter controller 311 and the third adapter communicator 310 include a CPU provided in the adapter 30. The adapter controller 411 and the third adapter communicator 410 include a computer such as a CPU provided in the adapter 40.

The adapter operation members 312 and 412 are operation members operated by the user in the adapters 30 and 40, and include switches, electronic rings, and the like. Here, a predetermined function is assigned to the operation of the adapter operation members 312 and 412. Alternatively, a user's favorite function is assigned through an unillustrated setting unit of the camera 20. Illustrative functions for the operation of the adapter operation members 312 and 412 include, for example, the following. When the adapter operation members 312 and 412 are switches, they are at least one of ON/OFF of the image stabilization function, setting of the image stabilization level of the image stabilization function, and switching between the autofocus and the manual focus. When the adapter operation members 312 and 412 are electronic rings, the adapter operation members 312 and 412 are at least one of an adjustment function of an aperture position (aperture diameter), an adjustment function of a focus position, and an adjustment function of a zoom position of the interchangeable lens 10. At least one of the aperture position, the focus position, and the zoom position is adjusted in the lens 10 by an adjustment amount corresponding to the amount by which the electronic ring is operated.

Referring now to a flowchart in FIG. 2, a description will be given of processing in which the camera 20 (camera controller 205) controls the interchangeable lens 10 (lens controller 114). Each of the camera controller 205 and the lens controller 114 executes this processing (and each processing described later) in accordance with an imaging control program that is a computer program.

When the camera 20 is activated in S201, the camera controller 205 proceeds to S202. In the step S202, the camera controller 205 supplies the power to the interchangeable lens 10 and the adapters 30 and 40 via an unillustrated power supply mount contact.

In the step S203, the camera controller 205 causes the first camera communicator 207 to detect the communication voltage used by the interchangeable lens 10, and sets the communication voltage used by the first camera communicator 207 and the camera second communicator 208 according to the detection result. Thereafter, the first camera communicator 207 and the second camera communicator 208 performs the first communication and the second communication with the first lens communicator 115 and the second lens communicator 116, respectively, using the set communication voltage. The processing in which the first camera communicator 207 detects the communication voltage of the interchangeable lens 10 will be described later.

Next, in S204, the lens controller 114 transmits, through the first lens communicator 115 (and the first camera communicator 207), ID information of the interchangeable lens 10 such as a lens name and lens specifications (referred to as a lens ID hereinafter) to the camera controller 205. The camera controller 205 receives the lens ID via the first camera communicator 207. The lens controller 114 transmits lens state data indicating the current state (lens state) of the interchangeable lens 10 to the camera controller 205 via the second lens communicator 116 (and the camera second communicator 208). The camera controller 205 receives the lens state data via the camera second communicator 208.

The lens state data includes the current positions (referred to as an optical element position hereinafter) of the focus lens 105, the magnification varying lens 106, the iris 107, and the image stabilization lens 108 acquired from the focus, zoom and iris controllers 109, 110, and 111 and the image stabilization controller 112 (referred to as the lens image data hereinafter). The lens state data includes a value obtained by normalizing the camera shake amount acquired from the shake detection unit 113, and lens operation data indicating the operation amount and operation state of the user operation acquired from the lens operation member 118. When the lens operation member 118 is an electronic ring, the operation amount per unit time of the electronic ring may be included in the lens operation data. If the lens operation member 118 is a switch, the ON/OFF state of the switch may be included in the lens operation data.

Next, in S205, the camera controller 205 determines lens state data received from the lens controller 114 by the second communication based on the lens state data acquired in S204. Then, a command requesting a transmission of the determined lens state data is transmitted to the lens controller 114 via the first camera communicator 207 (and the first lens communicator 115).

In the step S206, the lens controller 114 determines the lens status data indicating the current lens state to be transmitted to the camera controller 205 based on the command received from the camera controller 205 via the first lens communicator 115 in the step S205.

Next, in S207, the lens controller 114 transmits the determined lens state data to the camera controller 205 via the second lens communicator 116 (and the camera second communicator 208).

In the step S208, the camera controller 205 determines an imaging condition based on the lens state data received from the lens controller 114 via the camera second communicator 208, the magnification varying ratio of the adapter (extender) 30, and the transmittance of the adapter (ND adapter) 40. Then, imaging is performed under the imaging conditions. The imaging condition includes an object distance, a focal length, an F-number, a T value, a camera shake amount per unit time, and a shake correction angle for an image stabilization (shift amount of the image stabilization lens 108). The camera controller 205 displays on the image display unit 206 the generated captured image as well as a number, a symbol, a mark, an icon, and the like indicating the imaging condition superimposed on the captured image. A method in which the camera controller 205 acquires the magnification ratios and transmittances of the adapters 30 and 40 will be described later.

In the step S209, the camera controller 205 obtains operation data indicating a user operation on the camera operation member 210 (referred to as camera operation data hereinafter), and acquires the first adapter operation data and the second data from the adapter operation members 312 and 412. The camera operation data is data indicating exposure (F-number, shutter speed, etc.) and zoom position setting by operating a dial or electronic ring, instructions for AF/image stabilization execution/stop by operating a switch, and the like. The first and second adapter operation data will be described later. Further, processing in which the camera controller 205 acquires the first and second adapter operation data will be described later.

In the step S210, the camera controller 205 determines lens control data based on the lens state data acquired in the step S207, the camera operation data and the first and second adapter operation data acquired in the step S209. More specifically, the camera controller 205 acquires a phase difference from a phase difference sensor provided in the image sensor 204 in response to turning on of a switch instructing the execution of AF, and calculates a defocus amount of the imaging optical system using the phase difference. Moreover, it determines a driving amount of the focus lens 105 for obtaining the in-focus state from the calculated defocus amount. The camera controller 205 determines the driving amount of the magnification varying lens 106 based on data indicating the operation amount of the dial or the electronic ring. Further, the camera controller 205 determines the driving amount of the iris 107 based on the exposure setting value set by operating the dial and the luminance level of the image signal generated using the output from the image sensor 204. Further, the camera controller 205 determines whether or not the image stabilization lens 108 can be driven in accordance with turning on and off of a switch that instructs the execution and stop of the image stabilization.

In this way, the camera controller 205 determines the lens control data including the driving amounts of the focus lens 105, the magnification varying lens 106, and the iris 107 and whether or not the image stabilization is available.

Next, in S211, the camera controller 205 transmits a lens control command including lens control data to the lens controller 114 via the first camera communicator 207 (and the first lens communicator 115).

Next, in S212, the lens controller 114 passes the lens control data included in the received lens control command to the focus, zoom and iris controllers 109, 110, and 111. The focus, zoom, and iris controllers 109, 110, and 111 drive the focus lens 105, the zoom lens 106, and the iris 107 according to the lens control data. The lens controller 114 notifies the image stabilization controller 112 of whether or not the image stabilization included in the lens control data is available. When the image stabilization is permitted, the image stabilization controller 112 shifts the image stabilization lens 108 so as to reduce the image shake according to the camera shake amount detected by the shake detection unit 113.

As described above, in the initial communication (when the system is activated) between the camera 20 and the interchangeable lens 10, the lens specific information, such as the name, specification, and lens correction data of the interchangeable lens 10, is communicated. During the subsequent activation of the system, the data indicating the state of the imaging optical system of the interchangeable lens 10 including the focal length and the focus position, the data indicating the content of the operation performed on the camera 20 by the user, the above lens control data, and the like are communicated at a predetermined timing.

Figure 3A:
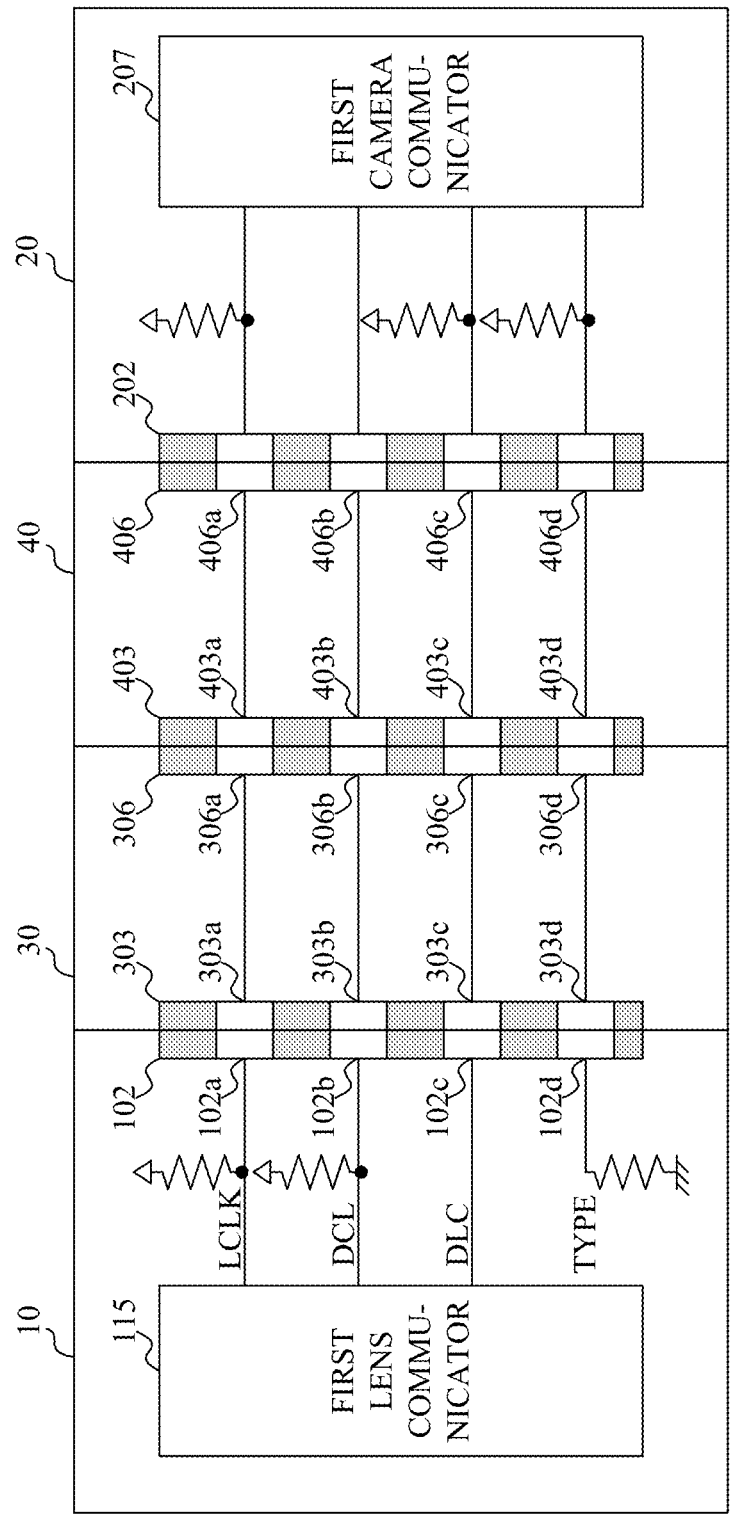
FIGS. 3A and 3B explain a first communication according to the first embodiment.
Figure 3B:
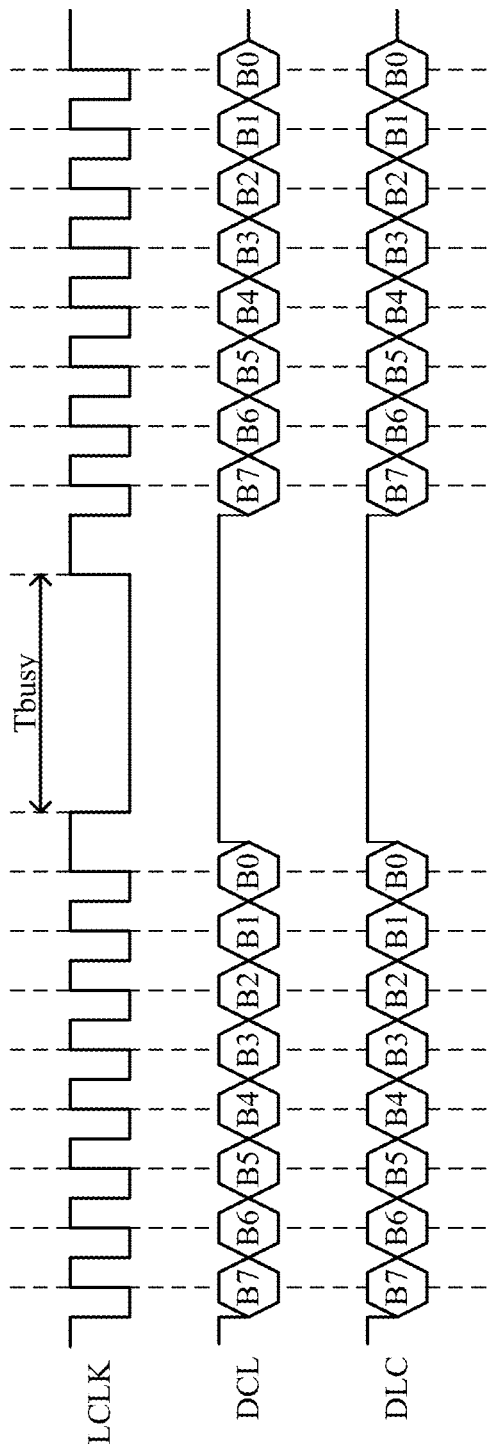

Referring now to FIGS. 3A and 3B, a description will be given of processing in which the first camera communicator 207 detects the communication voltage of the interchangeable lens 10 and communication processing in the first communication.

FIG. 3A illustrates a configuration of the first communication channel 100 for performing the first communication. In order to form the first communication channel 100 connected from the camera 20 to the interchangeable lens 10 via the adapters 30 and 40, the first communication contacts 102, 303, 306, 403, 406, and 202 have the following terminals.

The first communication contact 303 includes a first communication LCLK terminal 303a, a first communication DCL terminal 303b, a first communication DLC terminal 303c, and a TYPE terminal 303d. The first communication contact 306 includes a first communication LCLK terminal 306a, a first communication DCL terminal 306b, a first communication DLC terminal 306c, and a TYPE terminal 306d. The first communication contact 403 includes a first communication LCLK terminal 403a, a first communication DCL terminal 403b, a first communication DLC terminal 403c, and a TYPE terminal 403d. The first communication contact 406 includes a first communication LCLK terminal 406a, a first communication DCL terminal 406b, a first communication DLC terminal 406c, and a TYPE terminal 406d.

First communication LCLK terminals 102a, 303a, 306a, 403a, 406a, and 202a are provided to form a line for a clock signal LCLK output from the first camera communicator 207 (referred to as an LCLK line hereinafter). First communication DCL terminals 102b, 303b, 306b, 403b, 406b, and 202b are also provided in order to form a line for the camera data signal DCL output from the first camera communicator 207 (hereinafter referred to as a DCL line). In addition, first communication DLC terminals 102c, 303c, 306c, 403c, 406c, and 202c are also provided to form a lens data signal DLC line (hereinafter referred to as a DLC line) output from the first lens communicator 115. Each of the DLC line and the DCL line corresponds to a first data communication channel used during data communication. The LCLK line corresponds to a first notification channel used for notification of communication timing via the DCL line or the DLC line. The first communication is not limited to clock synchronous communication described later, and may be performed by an asynchronous communication.

TYPE terminals 102d, 303d, 306d, 403d, 406d, and 202d are also provided for forming an interchangeable lens type detection signal TYPE line (referred to as a TYPE line hereinafter) for detecting the communication voltage of the interchangeable lens 10. Four lines between the first communication contacts 303, 306, 403, and 406 provided in the adapters 30 and 40 constitute a relay channel that forms part of the first communication channel 100.

As illustrated in FIG. 3A, the LCLK line and the DCL line are pulled up in the interchangeable lens 10. The LCLK line and the DLC line are pulled up in the camera 20.

The LCLK line, DCL line, DLC line, and TYPE line in the adapters 30 and 40 are short-circuited between the first communication contacts 303 and 306 and between the first communication contacts 403 and 406, respectively.

The TYPE line is pulled down by a predetermined resistance value for each communication voltage in the interchangeable lens 10, and pulled up by a predetermined resistance value in the camera 20. The first camera communicator 207 detects the voltage value of the TYPE line, and specifies the communication voltage of the interchangeable lens 10 based on the voltage value determined from the resistance value in the interchangeable lens 10 and the resistance value in the camera 20.

FIG. 3B illustrates a communication format example of the first communication. This figure illustrates signal waveforms on the LCLK line, the DCL line, and the DLC line. The following description will refer to the clock signal LCLK as an LCLK signal, the camera data signal DCL transmitted and received through the DCL line as a DCL signal, and the lens data signal DLC transmitted and received through the DLC line as a DLC signal.

The first camera communicator 207 outputs the LCLK signal to the LCLK line, and outputs eight-bit data B7 to B0 as the DCL signal to the DCL line in synchronization with the leading edge of the LCLK signal. The first lens communicator 115 outputs eight-bit data B7 to B0 as a DLC signal to the DLC line in synchronization with the leading edge of the LCLK signal.

The first camera communicator 207 receives eight-bit (B7 to B0) data from the DLC line in synchronization with the leading edge of the LCLK signal. The first lens communicator 115 receives eight-bit (B7 to B0) data from the DCL line in synchronization with the leading edge of the LCLK signal. Thereby, the first camera communicator 207 and the first lens communicator 115 can communicate data with each other.

When receiving the eight-bit data from the DCL line, the first lens communicator 115 puts the voltage level of the LCLK line into low for the predetermined time Tbusy, and releases the low level when the predetermined time Tbusy passes. In other words, it puts the voltage level into high. The predetermined time Tbusy is a time for processing the data received by the lens controller 114, and during this time, the first camera communicator 207 does not transmit data to the first lens communicator 115. By repeating this communication processing, a data communication of a plurality of bytes is performed between the first camera communicator 207 and the first lens communicator 115 by the first communication.

In the second communication, the one-way communication may be performed from the interchangeable lens 10 to the camera 20 by the same clock synchronous communication as the first communication, or may be performed by the asynchronous communication. The third communication may be performed as the clock synchronous communication or the asynchronous communication as the bidirectional communication between the camera 20 and the adapters 30 and 40 and between the interchangeable lens 10 and the adapters 30 and 40, by a master-slave method or token passing method, etc.

Figure 11A:
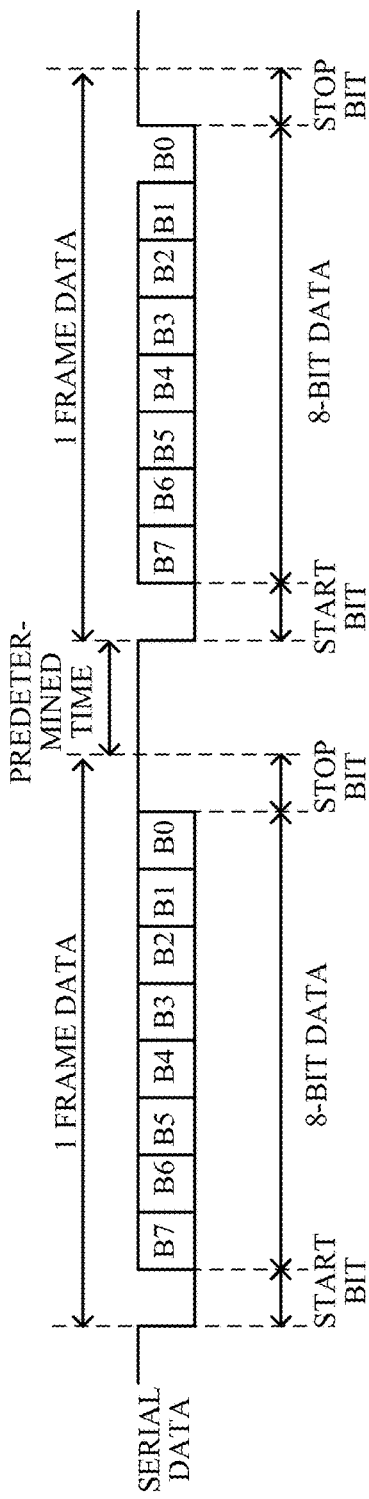
FIGS. 11A and 11B explain a second communication according to the first embodiment.

FIG. 11A illustrates a communication format example of the asynchronous communication performed in the second communication on the second communication channel 200. Herein, one frame is illustrated as the illustrative format of the data to be communicated, which includes ten bits or one-bit start bit, eight-bit data bits, one bit-stop bit. The data bits may be seven or sixteen bits, and may include a parity bit. The stop bits may have two bits.

Figure 11B:
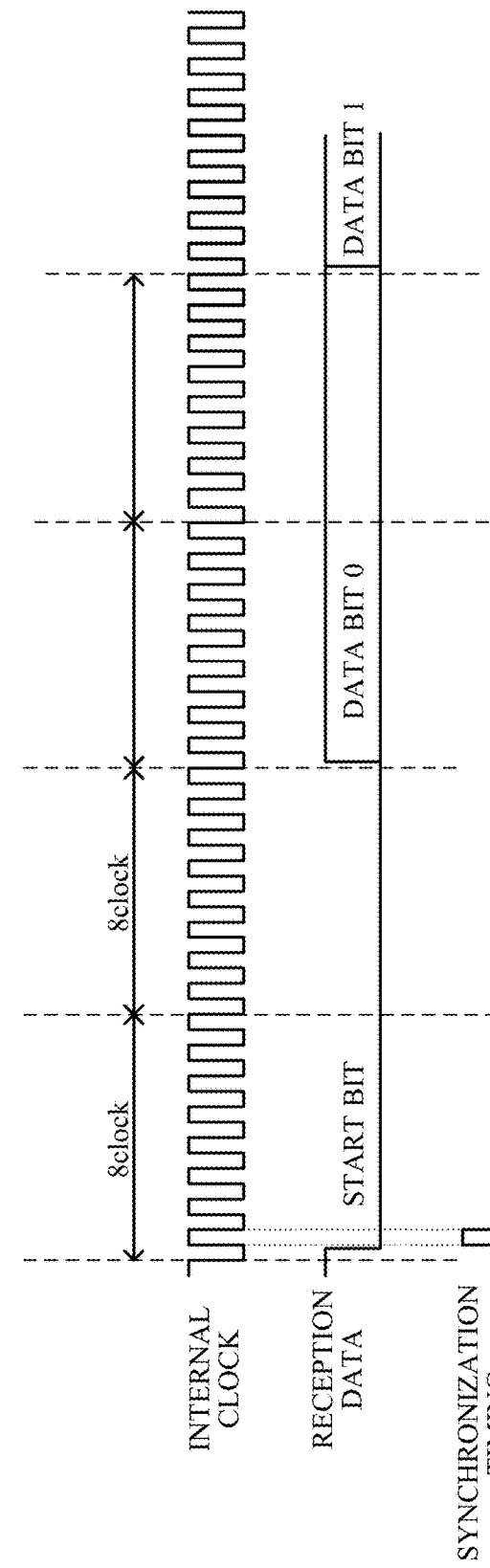

FIG. 11B illustrates a timing synchronization method of the asynchronous communication in the second communication. The camera controller 205 (and the second camera communicator 208) and the lens controller 114 (and the second lens communicator 117) send and receive data in synchronization with the internal clock in accordance with a predetermined clock frequency or the clock rate. For example, the internal clock is set to a clock rate 16 times as high as the communication rate between the camera controller 205 and the lens controller 114. The starting point of data sampling is determined by sampling the trailing edge of the start bit of the received data in synchronization with the internal clock, as shown as the synchronization timing in the figure. As illustrated as a data sampling timing in the figure, the data is latched at a position of eight clocks starting from this synchronization timing. Thereby, the data can be captured at the center of each bit. By performing this data sampling for each bit, the data communication is performed using only one second communication line (lens-camera transmission channel: DLC2).

The third communication channel 300 is a communication channel provided to enable the communication between the camera 20 and the adapters 30 and 40. The third communication channel 300 is used to transmit a command indicating an instruction to transfer to the power saving mode from the camera controller 205 to the adapter controllers 311 and 411 and the lens controller 114. Herein, the power saving mode is a mode in which the power consumption is lower than that in the normal operation. For example, the power saving mode is a mode that prohibits the data from being transmitted and received, and the movable optical element and the optical elements 309 and 409 in the imaging optical system from being driven. Moreover, the third communication channel 300 is also used to transmit a command indicating a communication counterpart in the one-to-one communication. It is also used to transmit information unique to the adapter controllers 30 and 40 to the camera controller 205. The information unique to the adapter controllers 30 and 40 will be described later.

Figure 12:
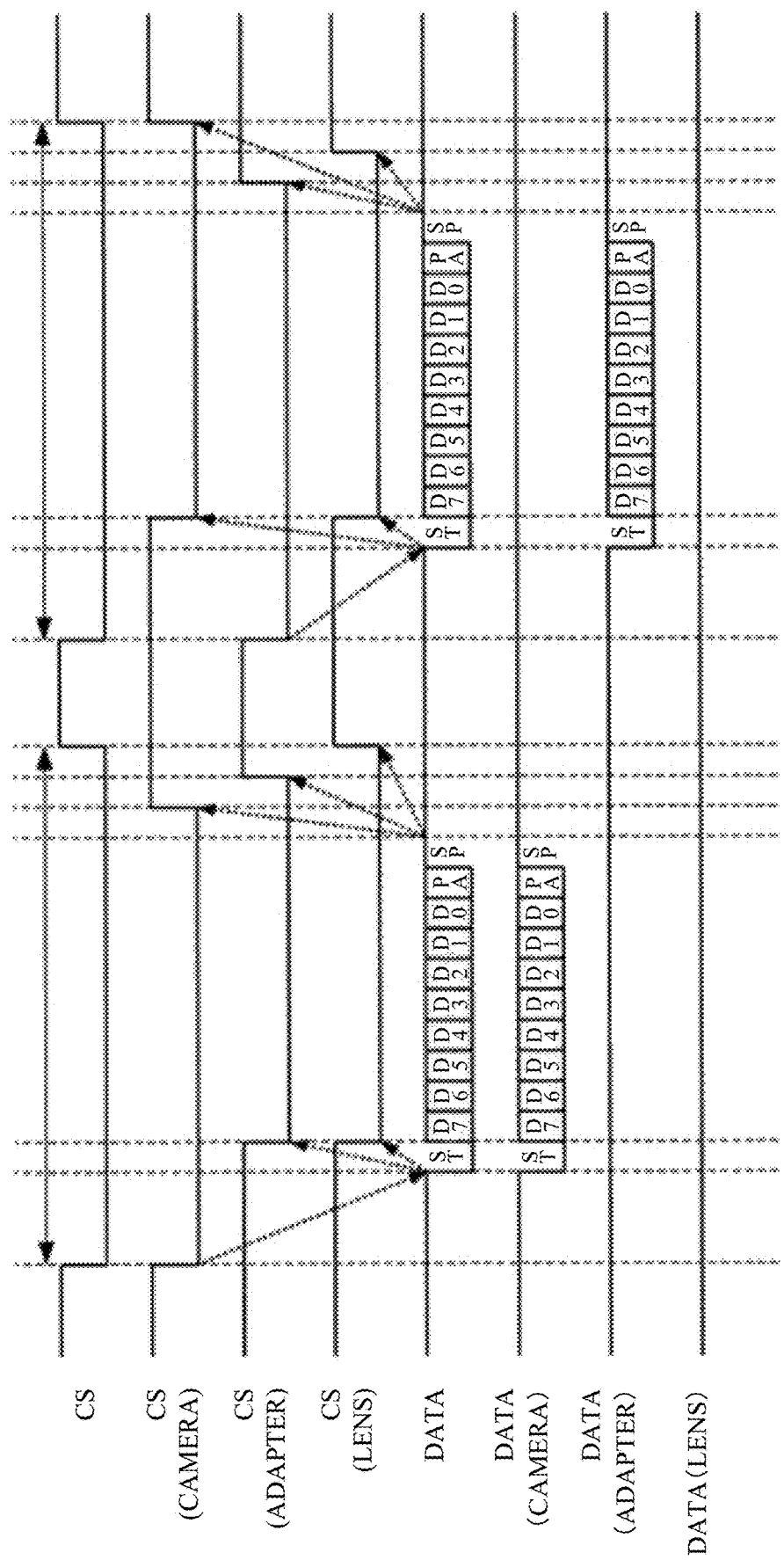
FIG. 12 is a diagram for explaining a third communication (one-to-many) according to the first embodiment.
Figure 13:
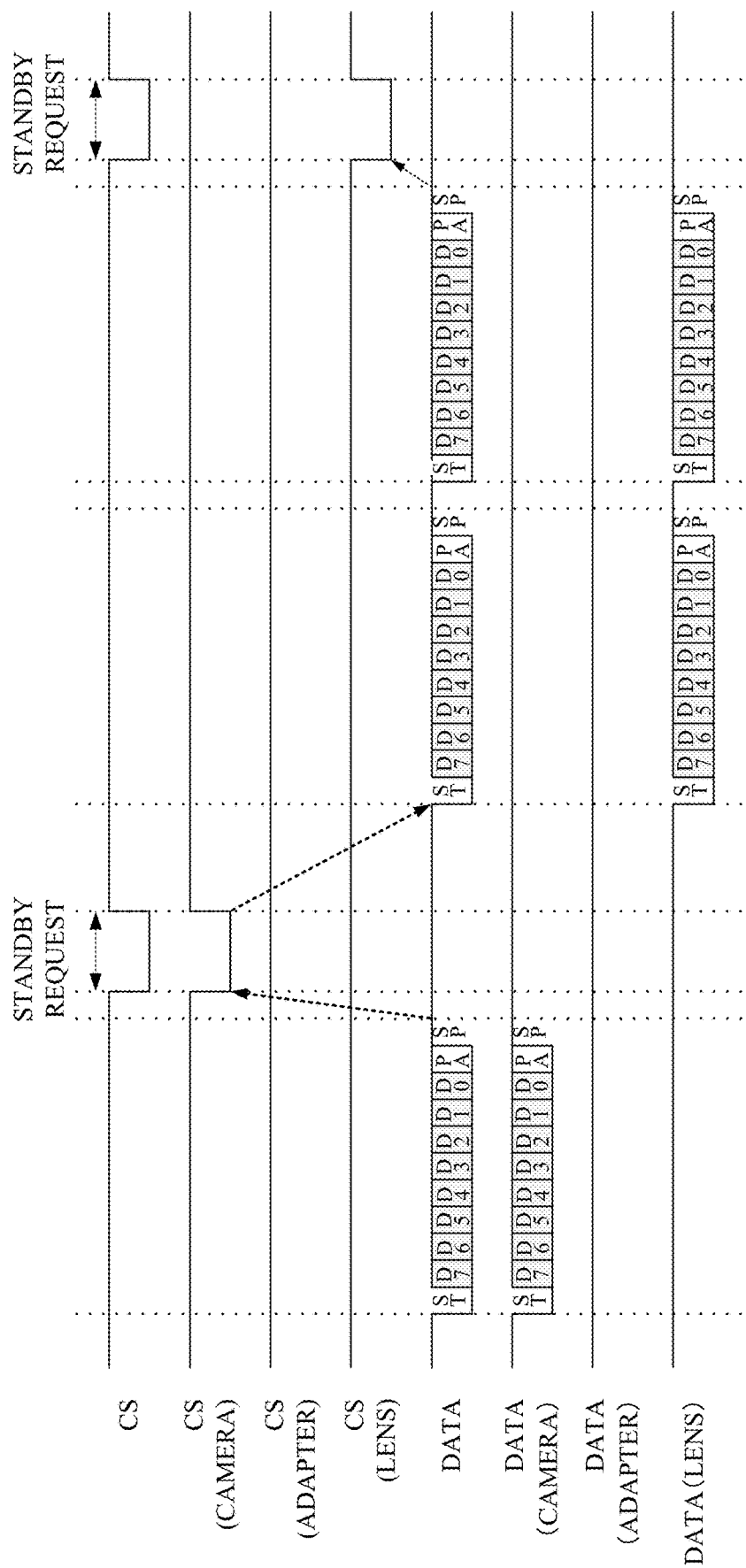
FIG. 13 is a diagram for explaining the third communication (one-to-one) according to the first embodiment.

Referring now to FIGS. 12 and 13, a description will be given of the asynchronous communication performed using the third communication channel 300. The third communication channel 300 includes two signal lines, or a notification channel CS used to communicate the communication timing and a data communication channel DATA used to transmit and receive the data. Herein, the data communication channel DATA corresponds to a second data communication channel used during the data communication. The notification channel CS corresponds to a second notification channel used for the notification of the timing of the communication via the data communication channel DATA.

FIG. 12 illustrates communication waveforms of the asynchronous communication performed in the third communication in the third communication channel 300. In particular, it illustrates the illustrative one-to-many communication in which data can be transmitted simultaneously from an apparatus on the data transmission side to an apparatus on a plurality of data reception sides. More specifically, the camera 20 transmits the data, and then the adapter 30 (or adapter 30) transmits the data. The communication performed by such a one-to-many component will be referred to as the broadcast communication hereinafter.

FIG. 12 illustrates one integrated signal output from the two adapters 30 and 40 (adapter controllers 311 and 411).

When all of the camera controller 205, the adapter controllers 311 and 411, and the lens controller 114 are configured to output High to the notification channel CS, the signal level of the notification channel CS becomes high. On the other hand, when at least one of the camera controller 205, the adapter controllers 311 and 411, and the lens controller 114 outputs Low to the notification channel CS, the signal level of the notification channel CS becomes Low.

In the third communication, a communication speed is set in advance on both the data transmission side and the data reception side, and the data communication is performed at a communication bit rate based on this setting. The communication bit rate indicates a data amount transferable per second, and its unit is bps (bit per second).

When no data communication is performed, the signal level of the data communication channel DATA is maintained at the high level. Next, in order to notify the data reception side of the start of data transmission, the signal level of the data communication channel DATA is set to be Low for one bit period. This one-bit period will be called a start bit ST, and a data frame starts with the start bit ST. One-byte data is transmitted in an eight-bit period from the second bit to the ninth bit following the start bit ST.

The notification channel CS is connected to the camera controller 205, the adapter controllers 311 and 411, and the lens controller 114, and each controller can detect the signal level (voltage level) of the notification channel CS. Further, the notification channel CS is pull-up-connected to an unillustrated power source disposed in the camera 20.

Each controller can set the signal level of the notification channel CS, and all the controllers 205, 311, 411, and 114 set the signal level of the notification channel CS to be high so that the signal level of the communication channel CS becomes high. In addition, when one of the controllers sets the signal level of the notification channel CS to low, the signal level of the communication channel CS becomes low.

In the third communication, the communication is performed using the camera controller 205 (and the third camera communicator 209) as the communication master and the adapter controllers 311 and 411 and the lens controller 114 as the communication slaves.

The camera controller 205 that is the communication master notifies the adapters 30 and 40 and the interchangeable lens 10 that are communication slaves of the start of communication by outputting Low to the notification channel CS. Next, the camera controller 205 transmits the data to the adapters 30 and 40 and the interchangeable lens 10 via the data communication channel DATA. On the other hand, the adapter controllers 311 and 411 and the lens controller 114 output Low to the notification channel CS in response to detecting the start bit ST described above via the data communication channel DATA. When the adapter controllers 311 and 411 and the lens controller 114 output Low to the notification channel CS, the signal level of the notification channel CS remains Low because the camera controller 205 outputs Low.

The adapter controllers 311 and 411 and the lens controller 114 notify the communication standby request by outputting Low to the notification channel CS. The communication standby request is for temporarily stopping the communication in the camera system, and the presence or absence of the communication standby request is determined based on the signal level of the notification channel CS.

The camera controller 205 outputs High to the notification channel CS after transmitting all the data. After receiving the stop bit SP transmitted from the data communication channel DATA, the adapter controllers 311 and 411 and the lens controller 114 execute an analysis of the received data and internal processing corresponding to the received data. Thereafter, after the preparation for executing the next communication is completed, High is output to the notification channel CS.

The camera controller 205, the adapter controllers 311 and 411, and the lens controller 114 confirm that each controller is ready to perform the next communication when the signal level of the notification channel CS returns to High.

In FIG. 12, the data transmitted by the camera controller 205 includes a transmission requesting command for the adapter controllers 311 and 411, and the adapter controllers 311 and 411 provide a data transmission following a data transmission by the adapter controllers 311 and 411. More specifically, after the signal level of the notification channel CS becomes High, the adapter controllers 311 and 411 output Low to the notification channel CS. This notifies the lens controller 114 and the camera controller 205 of the start of the communication. Next, the adapter controllers 311 and 411 transmit data to the lens controller 114 and the camera controller 205 via the data communication channel DATA.

On the other hand, the lens controller 114 and the camera controller 205 output Low to the notification channel CS in response to detecting the above start bit ST via the data communication channel DATA. When the lens controller 114 and the camera controller 205 output Low to the notification channel CS, the adapter controllers 311 and 411 output Low to the notification channel CS, so the signal level of the notification channel CS remains Low.

The adapter controllers 311 and 411 output High to the notification channel CS after transmitting all the data. After receiving the stop bit SP transmitted from the data communication channel DATA, the lens controller 114 and the camera controller 205 execute an analysis of the received data and internal processing corresponding to the received data. Then, after the preparation for executing the next communication is completed, High is output to the notification channel CS.

When the camera controller 205, the adapter controllers 311 and 411, and the lens controller 114 all output High to the notification channel CS, the signal level of the notification channel CS becomes High. The camera controller 205, the adapter controllers 311 and 411, and the lens controller 114 can confirm that each controller is ready to perform the next communication when the signal level of the notification channel CS returns to High.

FIG. 13 illustrates communication waveforms of the asynchronous communication performed in the third communication in the third communication channel 300. In particular, an example is illustrated in which communication is individually performed between the camera 20 and one component (one of the interchangeable lens 10 and the adapters 30 and 40) selected as the communication counterpart by the camera 20. Hereinafter, the communication performed by such a one-to-one component will be referred to as a P2P communication.

Information indicating a communication slave that is a communication counterpart in the P2P communication is transmitted from the camera controller 205 by the broadcast communication. In the P2P communication, the data transmission side does not output Low to the notification channel CS, and transmits data to the data reception side while maintaining the notification channel CS to be High. In other words, the voltage level of the notification channel CS during the data transmission from the camera 20 to the interchangeable lens 10 and the adapter 30 is made different between the broadcast communication and the P2P communication.

When the broadcast communication is switched to P2P communication, the data transmission first starts from the camera controller 205 which is the communication master.

FIG. 13 illustrates an example in which a two-byte data transmission is performed from the lens controller 114 to the camera controller 205 after a one-byte data transmission is made from the camera controller 205 to the lens controller 114.

After switching from the broadcast communication to the P2P communication is completed in each component constituting the camera system, the camera controller 205 as the communication master transmits data to the lens controller 114 via the data communication channel DATA. When completing the data transmission, the camera controller 205 notifies the communication standby request by setting the signal level of the notification channel CS to a low output. The camera controller 205 then returns the signal level of the notification channel CS to a high output after the preparation for receiving data is completed for the data receiving side.

Figure 5A:
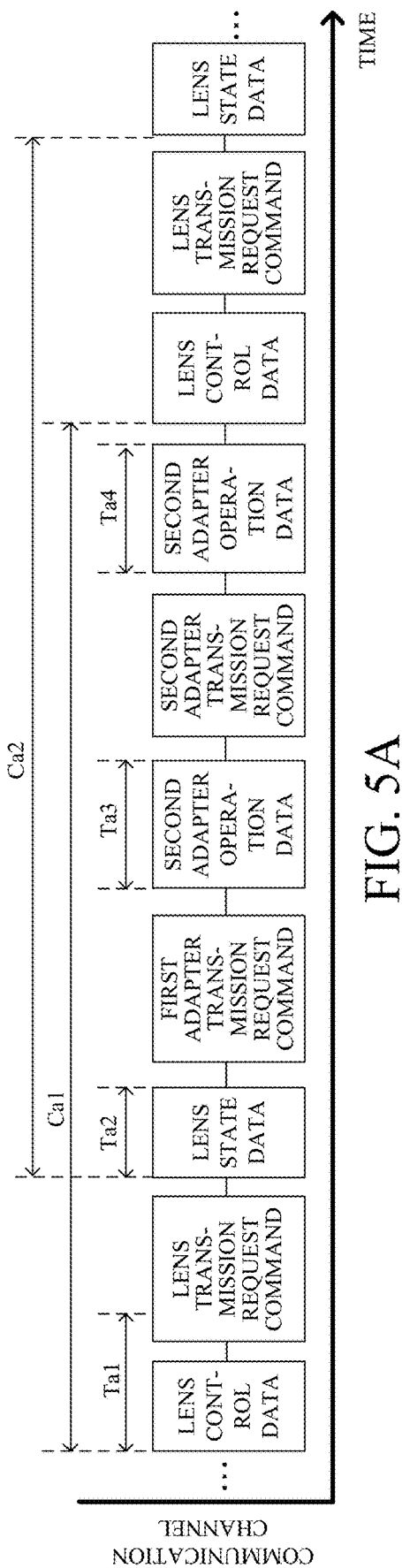
FIGS. 5A and 5B explain a data occupancy status of each communication according to the first embodiment.
Figure 5B:
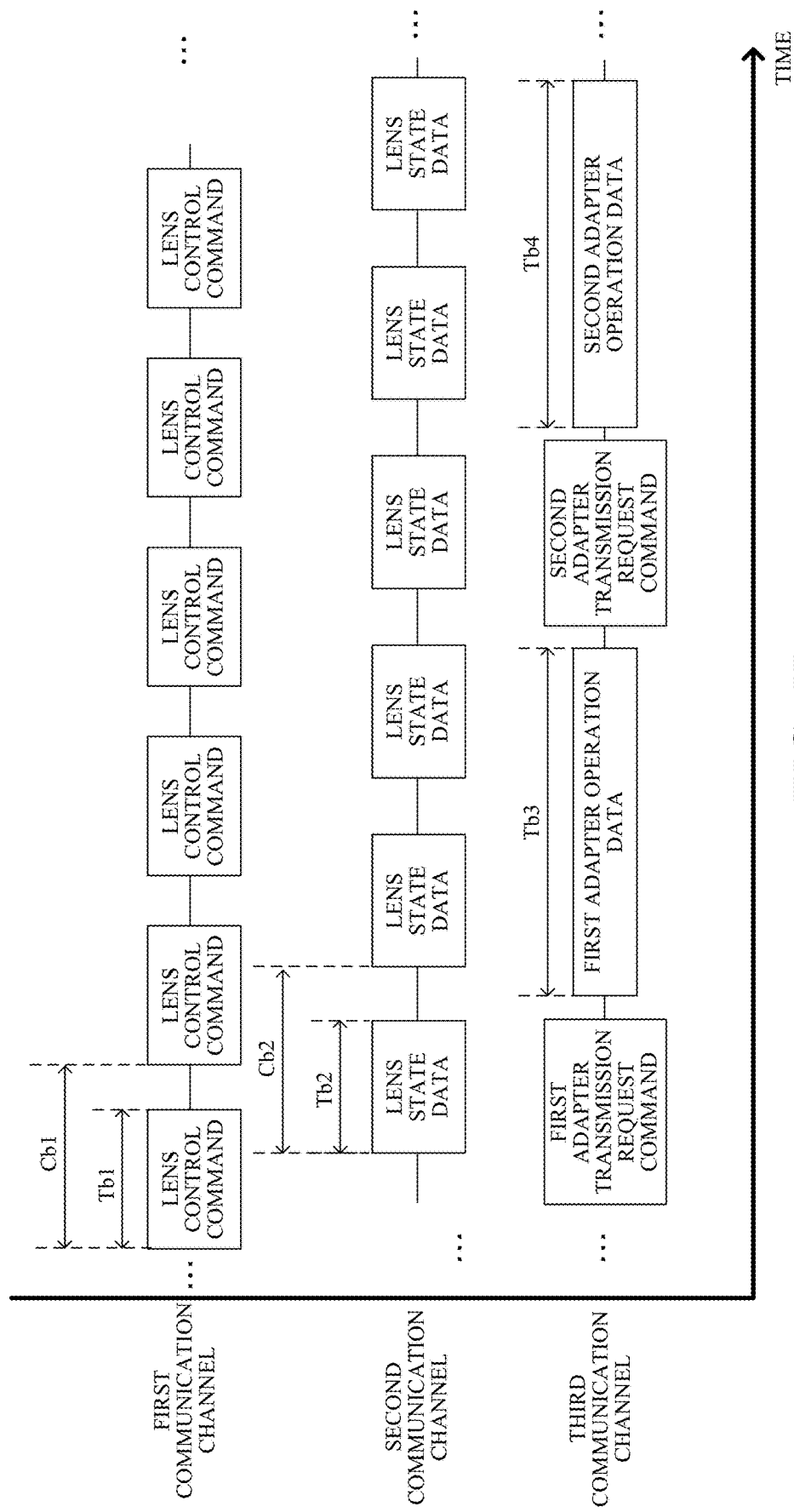

On the other hand, the lens controller 114 recognizes that the data transmission from the camera controller 205 is completed due to the signal level of the notification channel CS becoming Low, and executes an analysis of the received data and the internal processing corresponding to the received data. In the example of FIGS. 5A and 5B, the data received from the camera controller 205 includes a data transmission request from the lens controller 114 to the camera controller 205, and the lens controller 114 generates data to be transmitted to the camera controller 205.

Thereafter, when the signal level of the notification channel CS returns to High, the lens controller 114 that has recognized the cancellation of the communication standby request transmits two-byte data to the camera controller 205.

When the data transmission ends, the lens controller 114 notifies the communication standby request by setting the signal level of the notification channel CS to the low output. Then, the lens controller 114 returns the signal level of the notification channel CS to the high output after the preparation for receiving the data is completed for the data receiving side. The adapter microcomputer 302 that is not selected as the communication counterpart of the P2P communication does not change the output to the notification channel CS or does not participate in the data transmission/reception.

The lens controller 114 determines whether the P2P communication continues or is switched to the broadcast communication depending on the data transmission timing from the camera controller 205 after returning the signal level of the notification channel CS to High.

The signal level of the notification channel CS while the camera controller 205 is transmitting data is made different between the broadcast communication and the P2P communication. When the data from the camera controller 205 is received while the signal level of the notification channel CS remains high (second voltage level), the lens controller 114 determines that the P2P communication continues. On the other hand, when the data from the camera controller 205 is received after the signal level of the notification channel CS is changed to the low level (first voltage level), the lens controller 114 determines that the P2P communication has been switched to the broadcast communication.

As described above, in the P2P communication, the data transmission side changes the signal level of the notification channel CS from the high output to the low output to notify the data reception side that the data transmission by the data transmission side is completed. Therefore, in the P2P communication, a plurality of data frames can be continuously transmitted until the data transmission side changes the signal level of the notification channel CS. Thereby, a high-speed communication can be performed between the camera 20 and the accessory apparatus such as the interchangeable lens 10, the adapter 30, and the microcomputer 302. Then, the data transmission side notifies the communication standby request by maintaining the low signal output level of the notification channel CS until the data reception preparation is completed for the data reception side in the next communication.

Figure 4:
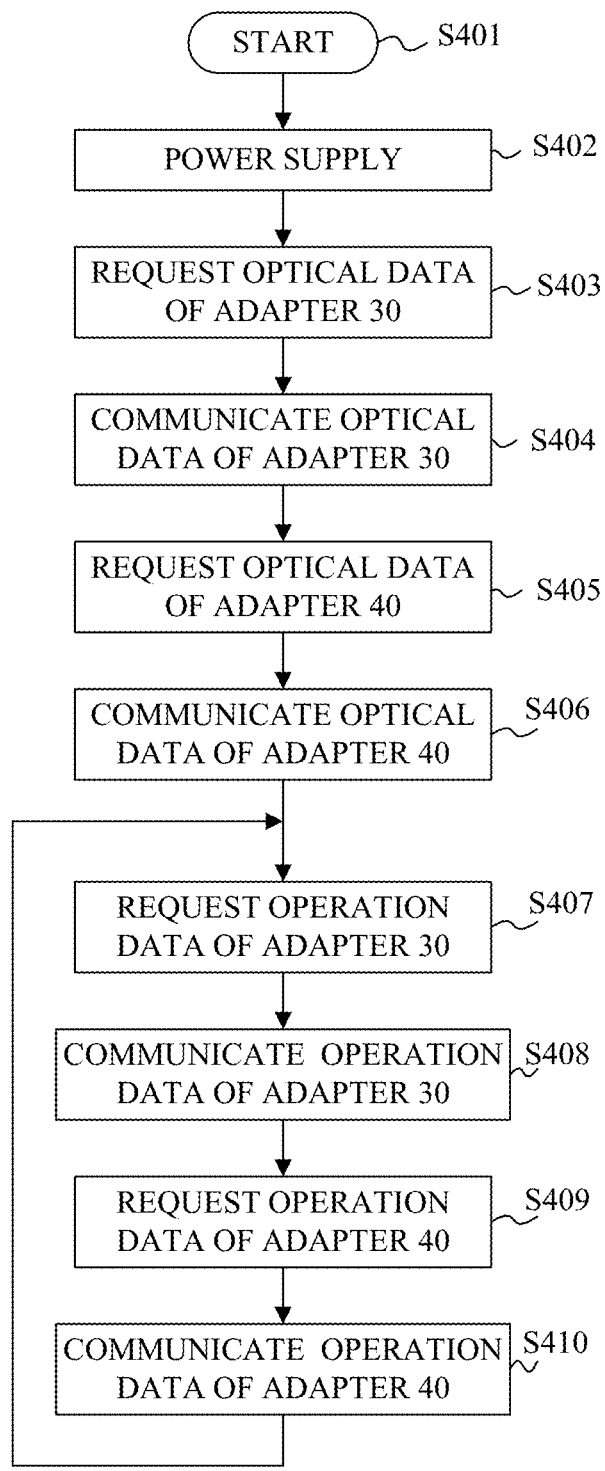
FIG. 4 is a flowchart illustrating adapter information acquisition processing according to the first embodiment.

Referring now to a flowchart in FIG. 4, a description will be given of processing in which the camera controller 205 acquires the magnification ratio of the adapter optical element (magnification variable lens) 309, the transmittance of the adapter optical element (ND filter) 409, and the first and second adapter operation data.

Figure 2:
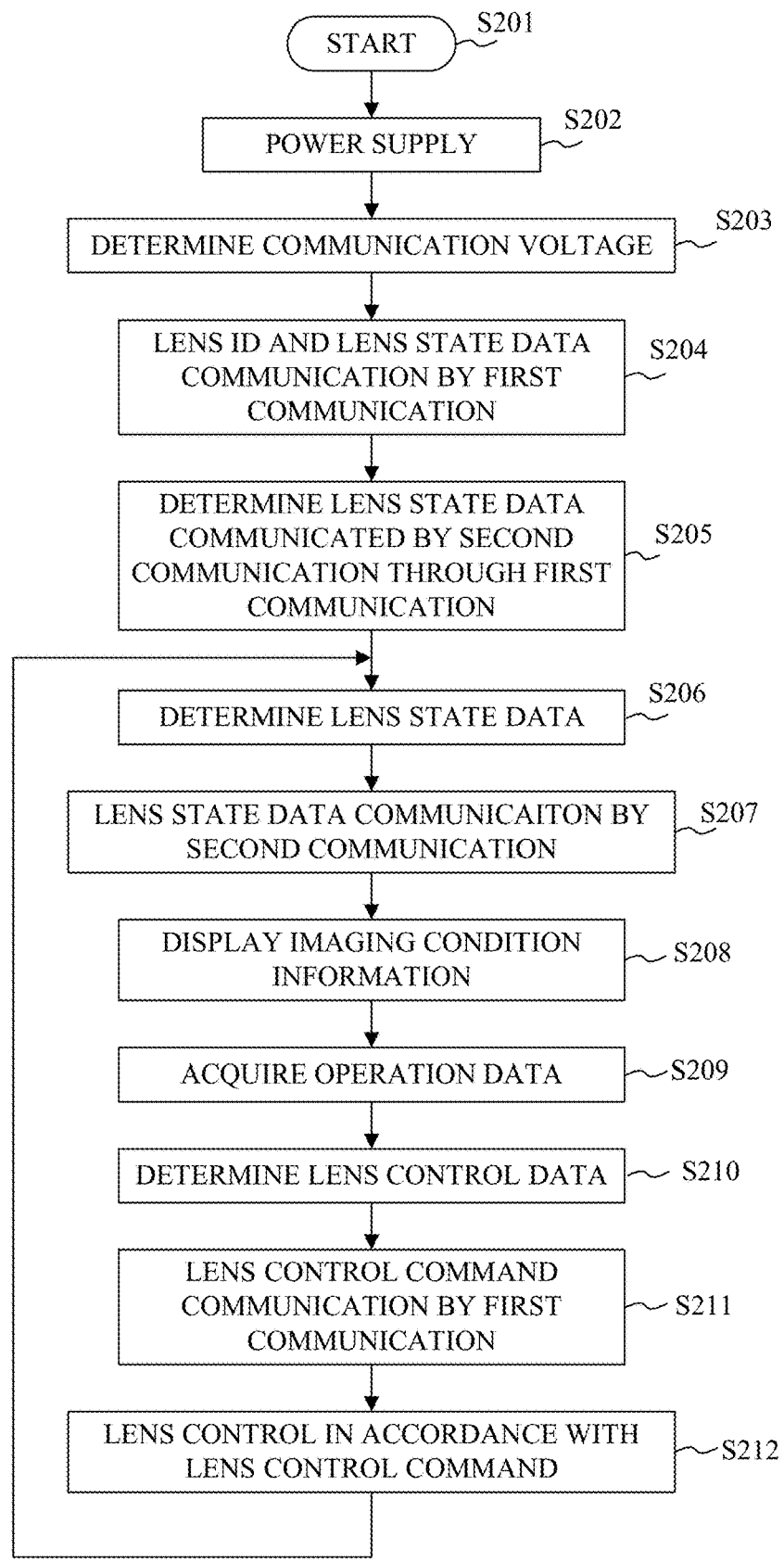
FIG. 2 is a flowchart showing lens control processing according to the first embodiment.

S401 and S402 are the same as S201 and S202 in FIG. 2. The camera controller 205 that has proceeded from S402 to S403 transmits a command that requests the adapter controller 311 to transmit the first adapter optical data, which is optical data of the adapter optical element 309, via the third camera communicator 209 (and the third adapter communicator 310).

In the step S404, the adapter controller 311 transmits the first adapter optical data stored in the internal memory to the camera controller 205 via the third adapter communicator 310 (and the third camera communicator 209). The first adapter optical data is data indicating the magnification ratio of the adapter optical element 309.

In the step S405, the camera controller 205 transmits a command that requests the adapter controller 411 to transmit the second adapter optical data that is optical data of the adapter optical element 409 to it via the third camera communicator 209 (and the third adapter communicator 410).

In the step S406, the adapter controller 411 transmits the second adapter optical data stored in the internal memory to the camera controller 205 via the third adapter communicator 410 (and the third camera communicator 209). The second adapter optical data is data indicating the transmittance of the adapter optical element 409.

Next, in the step S407, the camera controller 205 sends a command that requests the adapter controller 311 to transmit the first adapter operation data, which is operation data of the adapter operation member 312, to it via the third camera communicator 209 (and the third adapter communicator 310).

Next, in S408, the adapter controller 311 acquires an operational amount and an operation state from the adapter operation member 312. Then, data indicating them is transmitted as first adapter operation data to the camera controller 205 via the third adapter communicator 310 (and the third camera communicator 209). When the adapter operation member 312 is an electronic ring, the first adapter operation data is data indicating an operation amount per unit time of the electronic ring. When the adapter operation member 312 is a switch, the data indicates the ON/OFF state of the switch.

In the step S409, the camera controller 205 sends a command that requests the adapter controller 411 to transmit the second adapter operation data, which is operation data of the adapter operation member 412, to it via the third camera communicator 209 (and the third adapter communicator 410).

Next, in S410, the adapter controller 411 acquires an operational amount and an operation state from the adapter operation member 412. Then, data indicating them is transmitted as second adapter operation data to the camera controller 205 via the third adapter communicator 310 (and the third camera communicator 209). The second adapter operation data is data similar to the first adapter operation data. By repeating the processing from S407 to S410, the camera controller 205 can periodically acquire the operation data of the adapter operation member 312 and the adapter operation member 412.

For example, when the aperture position adjusting function is assigned to the adapter operation member 312, the camera 20 instructs the interchangeable lens 10 to change the aperture position via the first communication channel 100 in accordance with the operation amount of the adapter operation member 412 acquired in S410. When the ON/OFF function of the image stabilization function is assigned to the adapter operation member 312, the camera 20 instructs the interchangeable lens 10 to turn on or off the image stabilization control via the first communication channel 100 in accordance with the operation state (ON or OFF) of the adapter operation member 412 acquired in S410. This is similarly applied to the adapter operation member 412. The user can control the state of the imaging optical system of the interchangeable lens 10 through the operations of the adapter operation members 312 and 412.

The above embodiment has described the magnification ratio and transmittance of the adapter optical elements 309 and 409 as the illustrative first and second adapter optical data.

Information unique to the adapter 30 or information unique to the adapter 40 other than the first and second adapter optical data may be communicated via the third communication channel 300. The information unique to the adapter 30 may include, for example, at least one of a name and a specification of the adapter 30, and correction data of the adapter optical element 309. Similarly, the information unique to the adapter 40 may include, for example, at least one of the name and specification of the adapter 40, and correction data of the adapter optical element 409. For example, at least one of the name, specification, correction data of the adapter optical elements 309 and 409 is transmitted to the camera 20 during the initial communication between the camera 20 and the adapter 30 and between the camera 20 and the adapter 40.

Further, when the state of the imaging optical system of the interchangeable lens 10 or adapter optical element 309 or 409, etc. changes, and thereby the focal length information, the light transmittance information, etc. changes over time, the adapters 30 and 40 may transmit these update data to the camera 20 in a normal state such as an ongoing imaging standby. Due to the above processing, the camera controller 205 can acquire the magnification ratio and the transmittance of the adapter optical elements 309 and 409 just after starting the power supply, and periodically acquire the operation amount and the operation state of the adapter operation members 312 and 412, as soon as the start of the power supply.

Referring now to FIGS. 5A and 5B, a description will be given of an occupancy status of communication data in the first communication channel 100, the second communication channel 200, and the third communication channel 300. This description assumes that the lens control command, the lens state data, and the adapter operation data all have the same size.

FIG. 5A illustrates the occupancy state of the communication data in the communication channel in the camera system as a comparative example having only one communication channel. The horizontal axis in the figure indicates time. Ta1, Ta2, Ta3, and Ta4 indicate transmission times of the lens control command, lens state data, first adapter operation data, and second adapter operation data, respectively. Ca1 and Ca2 indicate transmission intervals between the lens control commands and between the lens state data, respectively.

The lens transmission requesting command is a command (data) for the camera controller 205 to request the lens controller 114 to transmit the lens state data. The lens controller 114 transmits the lens state data to the camera controller 205 in response to receiving the lens transmission requesting data. The first adapter transmission requesting data and the second adapter transmission requesting command are data for the camera controller 205 to request the adapter controllers 309 and 409 to transmit the first and second adapter operation data, respectively. In response to receiving the first and second adapter transmission requesting data, the adapter controllers 311 and 411 transmit the first and second adapter operation data to the camera controller 205, respectively.

In FIG. 5A, since the lens control command, the lens state data, and the first and second adapter operation data are sequentially communicated in a single communication channel, the transmission intervals Ca1 and Ca2 become longer between the lens control data and between the lens state data. The adapter controllers 311 and 411 need to correspond to the same communication speeds as those of the lens controller 114 and the camera controller 205.

On the other hand, FIG. 5B illustrates the occupancy state of the communication data in the camera system according to this embodiment having the first communication, the second communication, and the third communication channel 300. The horizontal axis in the figure indicates time. Tb1, Tb2, Tb3, and Tb4 indicate transmission times of the lens control command, the lens state data, the first adapter operation data, and the second adapter operation data, respectively. Cb1 and Cb2 indicate transmission intervals between lens control commands and between lens state data, respectively.

As illustrated in FIG. 5B, the lens control command, the lens state data, and the first and second adapter operation data are communicated through communication channels different from each other. Thereby, the camera controller 205 performs the first communication regardless of whether the camera controller 205 and the adapter controllers 30 and 40 are performing the third communication. Further, the lens control command, the lens state data, and the first and second adapter operation data are communicated through communication channels different from each other, so that the transmission interval Cb1 between the lens control commands is sufficiently shorter than Ca1 illustrated in FIG.

5A. Similarly, the transmission interval Cb2 between the lens state data is also sufficiently shorter than Cb1. Thereby, the camera 20 can control the interchangeable lens 10 at a higher speed than the comparative example of FIG. 5A.

This embodiment limits devices connected to the first and second communication channels 200 to the camera 20 and the interchangeable lens 10. Thereby, compared with a case where another device (adapter) is connected to the communication channel of the camera 20 and the interchangeable lens 10 as in the comparative example, a signal can be prevented from degraded due to the reflection of signals to be communicated. As a result, the communication speed can be made higher between the camera 20 and the interchangeable lens 10 in comparison with the comparative example. Hence, if the communicated data sizes are the same, Tb1 and Tb2 are shorter than Ta1 and Ta2. Furthermore, since the devices connected to the second communication channel 200 are limited to the camera 20 and the interchangeable lens 10, it is unnecessary to transmit the lens transmission requesting command from the camera 20 to the interchangeable lens 10 and the transmission interval between the lens state date can be made shorter.

In this embodiment, the transmission times Tb3 and Tb4 of the first and second adapter operation data are longer than Tb3 and Tb4. This eliminates the need for the adapters 30 and 40 to support a high-speed communication by setting the communication rate of the third communication slower regardless of the communication rates of the first and second communications.

Further, in this embodiment, the lens control command, the lens state data, the first adapter operation data, and the second adapter operation data can be communicated at an arbitrary communication timing without being obstructed by the channel occupancy due to the other data communication. For example, a communication is available not only during the initial communication performed when the interchangeable lens, adapters 30 and 40, and the like are attached to the camera 20, but also during the ongoing imaging standby or ongoing imaging operation in the camera 20.

As described above, this embodiment performs a communication of a variety of commands and data performed among the camera 20, the interchangeable lens 10, and the adapters 30 and 40 at proper communication timings without being obstructed by another communication. In comparison with a case where there is only one communication channel, various commands and data can be more stably communicated at short intervals, and the stability of the interchangeable lens control, the operability of the adapter, etc. can be improved.

Further, since only the camera 20 and the interchangeable lens 10 are connected to the first and second communication channels 200, the first and second communications can be expedited and enhanced in function, and the controllability of the interchangeable lens can be further improved. In addition, when the camera 20 switches the communication voltage according to the communication voltage of the interchangeable lens 10, a plurality of interchangeable lenses having different communication voltages can be connected to the camera 20. Further, by performing the third communication between the camera 20 and the adapters 30 and 40 separately from the first and second communication, it is unnecessary to use an adapter that matches the high communication speed of the camera 20 and the interchangeable lens 10. As described above, for example, the camera 20 can be realized which can be mounted with both an old interchangeable lens corresponding to the first communication having a high communication voltage and having no contacts with the second communication and the third communication and a new interchangeable lens corresponding to the first communication, the second communication, and the third communication having low communication voltages for the low power consumption. In this case, the cost of the electric circuit can be reduced for the new interchangeable lens since the new interchangeable lens can set a low communication voltage for the first communication, and can communicate at the same voltage as the low communication voltages of the second communication and the third communication.

This embodiment has described the adapters 30 and 40 communicating the first and second adapter operation data to the camera 20 through the third communication. However, the interchangeable lens 10 may communicate data relating to the interchangeable lens 10 (such as lens operation data) to the camera 20 via the third lens communicator 117, the third adapter communicator 310, and the third camera communicator 209.

In addition, the interchangeable lens that performs the communication with a communication voltage different from the communication voltages of the adapters 30 and 40 may not have the third lens communicator 117 or the third communication contact 104. This configuration can prevent the third lens communicator 117 and the third adapter communicators 310 and 410 from being connected with the communication voltages different from each other.

Second Embodiment

Figure 6:
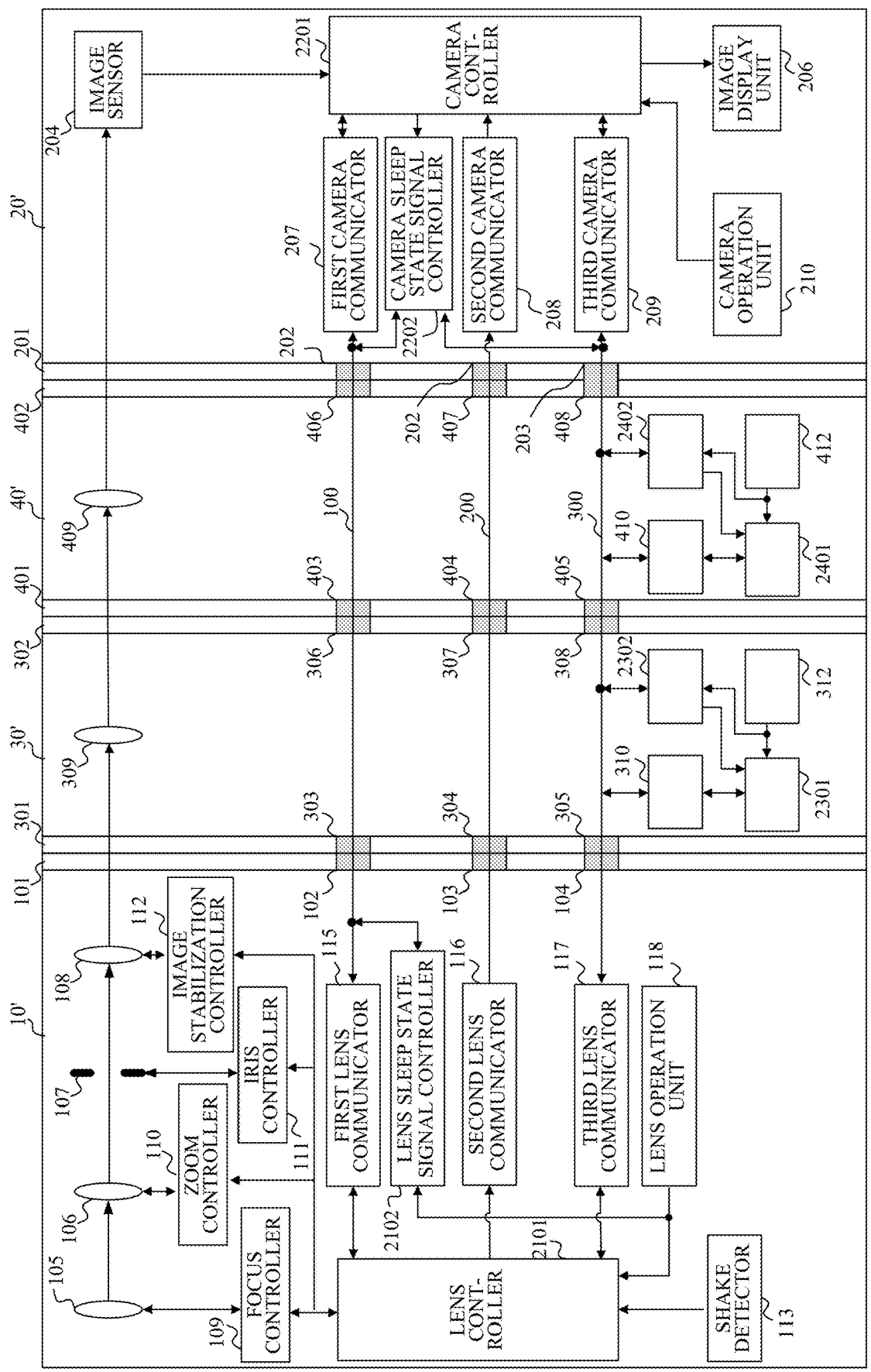
FIG. 6 is a block diagram showing a configuration of a camera system according to a second embodiment of the present invention.

Referring now to FIG. 6, a description will be given of a second embodiment of the present invention. In this embodiment, those elements, which are corresponding elements in the first embodiment, will be designated by the same reference numerals and a description thereof will be omitted.

In this embodiment, the camera individually transfers the interchangeable lens and the adapter between a normal operation state (first state: referred to as a normal state hereinafter) that provides a communication, and a low power consumption state (second state: referred to as a sleep state hereinafter) that does not provide a communication and is lower in power consumption than that in the normal state. When the interchangeable lens is in the sleep state, this embodiment uses the first communication channel 100 as a channel for transmitting a lens activation signal for activating the interchangeable lens. When the adapter is in the sleep state, this embodiment uses the third communication channel 300 as a channel for transmitting an adapter activation signal that starts the adapter. The lens activation signal and the adapter activation signal are transmitted to the interchangeable lens and the adapter by a transmission method different from the first communication and the third communication performed in the normal state.

In FIG. 6, when an interchangeable lens 10' is in the sleep state, the camera controller 2201 in a camera 20' sends the lens activation signal to a lens controller 2101 via a camera sleep state signal controller 2202 and the first communication channel 100. The lens controller 2101 in the interchangeable lens 10' receives the lens activation signal from the camera controller 2201 via the first communication channel 100 and the lens sleep state signal controller 2102 when the interchangeable lens 10' is in the sleep state. Furthermore, when the adapters 30' and 40' are in the sleep state, the camera controller 2201 sends the adapter activation signal to adapter controllers 2301 and 2401 in adapters 30' and 40' via the camera sleep state signal controller 2202 and the third communication channel 300.

Figure 7:
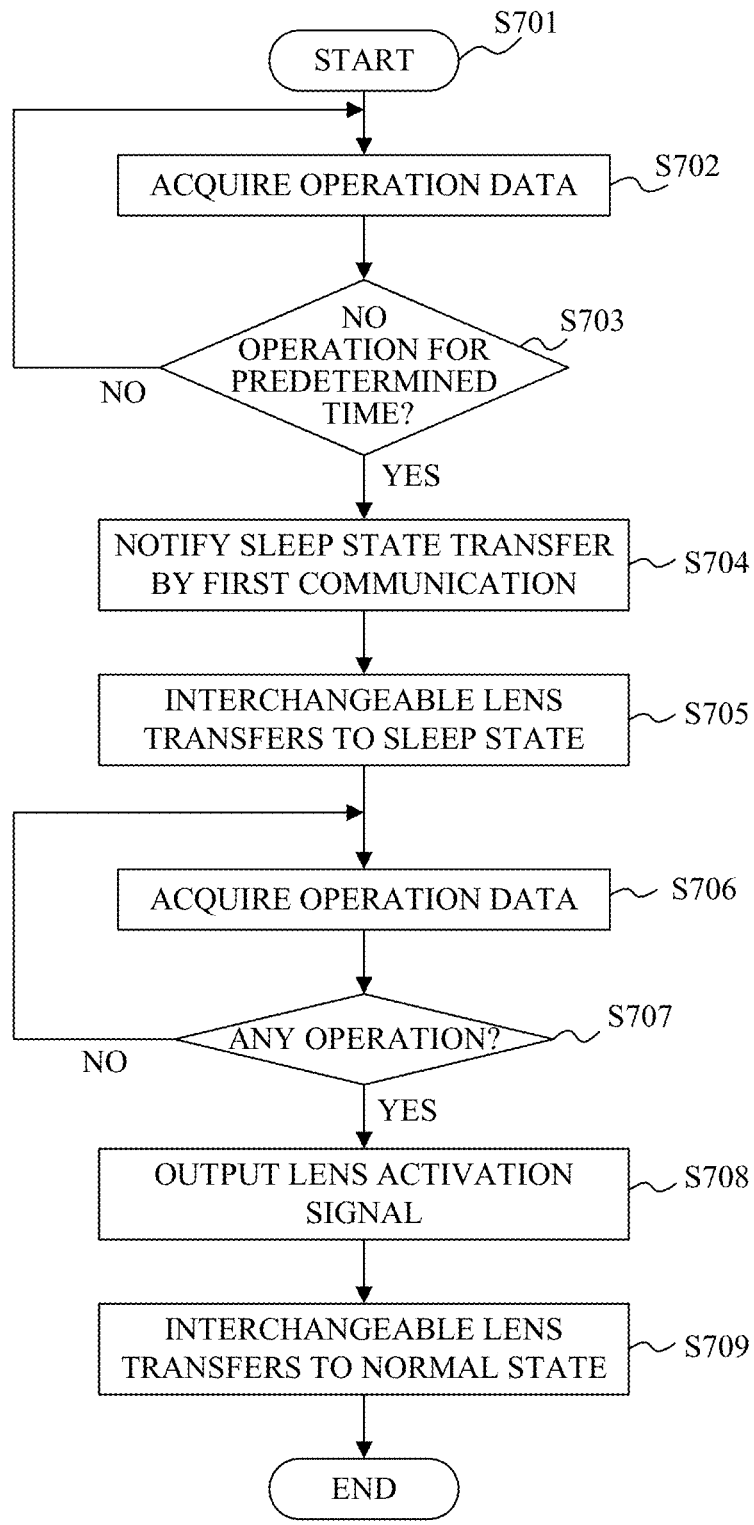
FIG. 7 is a flowchart showing lens control processing according to the second embodiment.

A flowchart in FIG. 7 illustrates processing in which the camera 20' transfers the interchangeable lens 10' from the normal operation state (referred to as a normal state hereinafter) to the sleep state, and returns the interchangeable lens 10' to the normal state. The normal state of the interchangeable lens 10' means a state in which the interchangeable lens 10' can perform the first, second, and third communications, and the camera 20' can control driving of the movable optical element in the imaging optical system of the interchangeable lens 10'. The sleep state of the interchangeable lens 10' indicates a state in which the interchangeable lens 10' stops the first, second, and third communications and consumes the power lower than the normal state.

In the step S702, the camera controller 2201 that has started processing in S701 acquires the camera operation data and the first and second adapter operation data described in the first embodiment. Then, the flow proceeds to S703.

In S703, the camera controller 2201 determines whether the time during which there is no change in the camera operation data or the first and second adapter operation data has exceeded a predetermined time. In other words, it is determined whether or not the non-operation time during which the operation members 207, 312, and 412 of the camera 20' or the adapters 30' and 40' are not operated by the user exceeds the predetermined time. If the non-operation time exceeds the predetermined time, the camera controller 2201 proceeds to S704, and if not (if there is an operation), the camera controller 2201 repeats the processing of S703. The predetermined time is time enough to determine that the user is not performing an operation for imaging, such as several seconds.

In S704, the camera controller 2201 transmits a command requesting the lens controller 2101 to transfer to the sleep state via the first camera communicator 207 (and the first lens communicator 115). Then, the flow proceeds to S705.

In S705, the lens controller 2101 transfers the interchangeable lens 10' to the sleep state in response to the request to transfer to the sleep state received through the first lens communicator 115. Only the lens sleep state signal controller 2102 operates in the interchangeable lens 10' in the sleep state.

In the step S706, the camera controller 2201 acquires the camera operation data and first and second adapter operation data again. Then, the flow proceeds to S707.

In S707, the camera controller 2201 determines whether or not the camera operation data or the first and second adapter operation data acquired in S702 and S706 has changed. In other words, it is determined whether or not the operation members 207, 312, and 412 of the camera 20' or the adapters 30' and 40' are operated by the user. The camera controller 2201 proceeds to step S708 when determining that the operation has been performed, and otherwise (if there is no operation) repeats the determination in the step S707.

In S708, the camera controller 2201 outputs a lens activation signal to the first communication channel 100 via the camera sleep state signal controller 2202. Processing for outputting the lens activation signal to the first communication channel 100 will be described later.

Next, in S709, the lens sleep state signal controller 2102 to which the lens activation signal is input activates the lens controller 2101 and transfers the interchangeable lens 10' to the normal state. Then, this flow ends.

By this processing, the camera controller 2201 can transfer only the interchangeable lens 10' from the normal state to the sleep state, and can transfer from the sleep state to the normal state.

Figure 8:
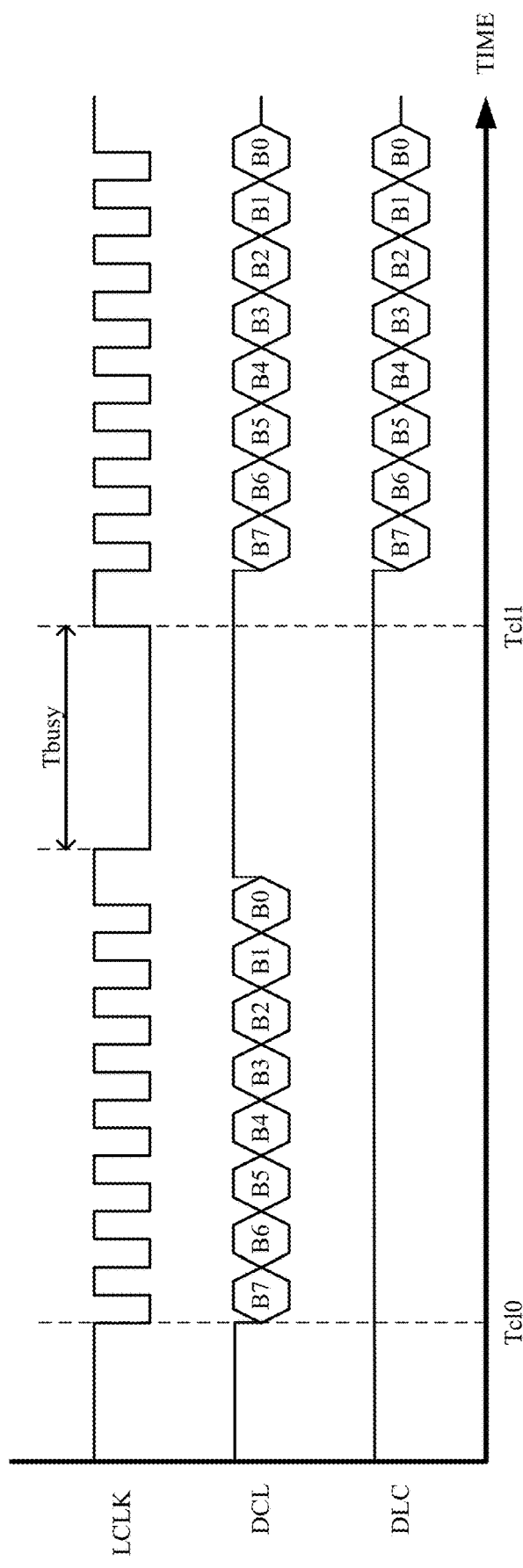
FIG. 8 is a diagram for explaining a first communication when an interchangeable lens is activated from a camera according to the second embodiment.

Referring now to FIG. 8, a description will be given of processing for outputting the lens activation signal to the first communication channel 100. FIG. 8 illustrates signal waveforms on the LCLK line, the DCL line, and the DLC line when the camera sleep state signal controller 2202 outputs the lens activation signal.

When the lens activation signal is input from the camera controller 2201 in the step S708 in FIG. 7, the camera sleep state signal controller 2202 outputs the LCLK signal to the LCLK line from time Tc10, and outputs a specific data bit string (B7 to B0). The LCLK signal and a specific data bit string signal are transmitted as a lens activation signal to the lens sleep state signal controller 2102.

The lens sleep state signal controller 2102 activates the lens controller 2101 in response to detecting a change in at least one of the LCLK line and the DCL line in the sleep state. Thereby, the interchangeable lens 10' transfers to the normal state. Thereafter, the first lens communicator 115 outputs Low to the LCLK line for a predetermined time Tbusy, and cancels the Low output at time Tc11 when the predetermined time Tbusy passes. Thereafter, the first communication illustrated in FIG. 3B can be performed between the camera controller 2201 and the lens controller 2101.

This processing can transfer only the interchangeable lens 10' from the sleep state to the normal state using the first communication channel 100.

Figure 9:
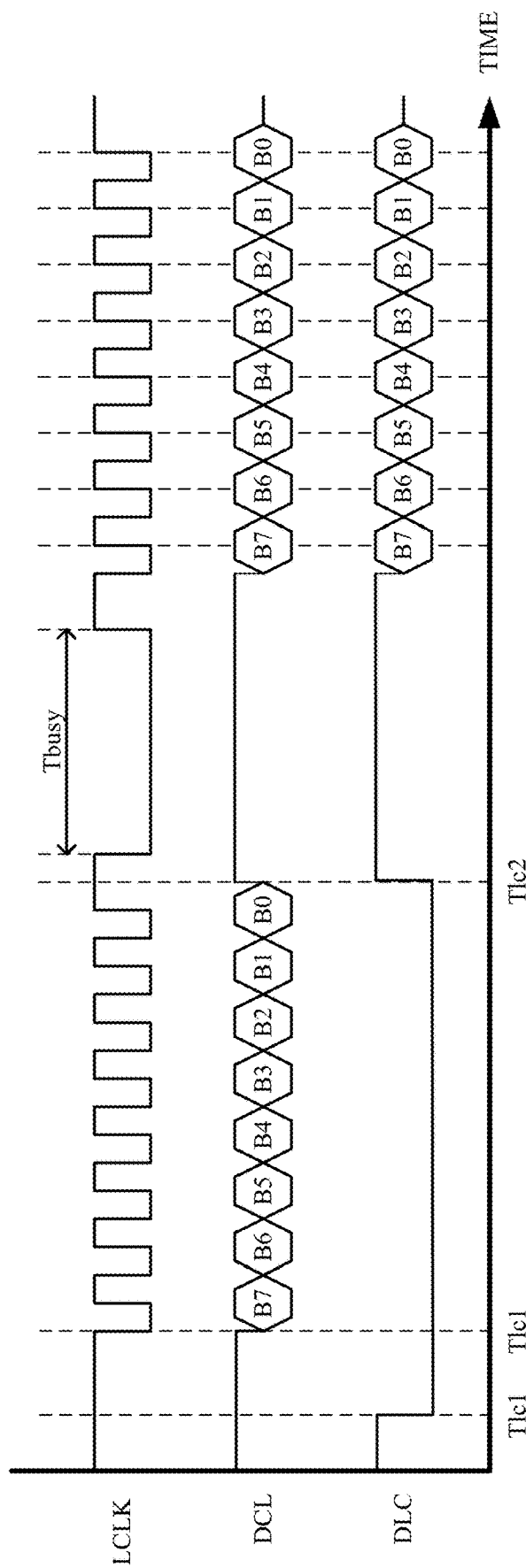
FIG. 9 is a diagram for explaining the first communication when an interchangeable lens is activated from the interchangeable lens according to the second embodiment.

Referring now to FIG. 9, a description will be given of processing for transferring the interchangeable lens 10' from the sleep state to the normal state in accordance with the operation of the lens operation member 118. FIG. 9 illustrates signal waveforms on the LCLK line, the DCL line, and the DLC line when the interchangeable lens 10' transfers from the sleep state to the normal state in accordance with the operation of the lens operation member 118.

When the lens sleep state signal controller 2102 detects the operation of the lens operation member 118, the lens sleep state signal controller 2102 outputs Low as the lens activation request signal to the DLC line from time Tlc0 illustrated in FIG. 9. When the camera sleep state signal controller 2202 detects Low on the DLC line, the first camera communicator 207 outputs the LCLK signal to the LCLK line from time Tlc1 and outputs a specific data bit string (B7 to B0) to the DCL line. The LCLK signal and a specific data bit string signal are transmitted as a lens activation signal to the lens sleep state signal controller 2102.

The lens sleep state signal controller 2102 activates the lens controller 2101 in response to detecting a change in at least one of the LCLK line and the DCL line in the sleep state of the interchangeable lens 10'. Thereby, the interchangeable lens 10' transfers to the normal state. Thereafter, the first lens communicator 115 cancels the low output on the DLC line at time Tlc2. Thereafter, the first lens communicator 115 outputs Low to the LCLK line for the predetermined time Tbusy, and cancels the Low output when the predetermined time Tbusy elapses. Thereafter, the first communication illustrated in FIG. 3B can be performed between the camera controller 2201 and the lens controller 2101.

This processing can transfer only the interchangeable lens 10' to the normal state using the first communication channel 100 in response to the operation of the lens operation member 118 of the interchangeable lens 10' in the sleep state.

Figure 10:
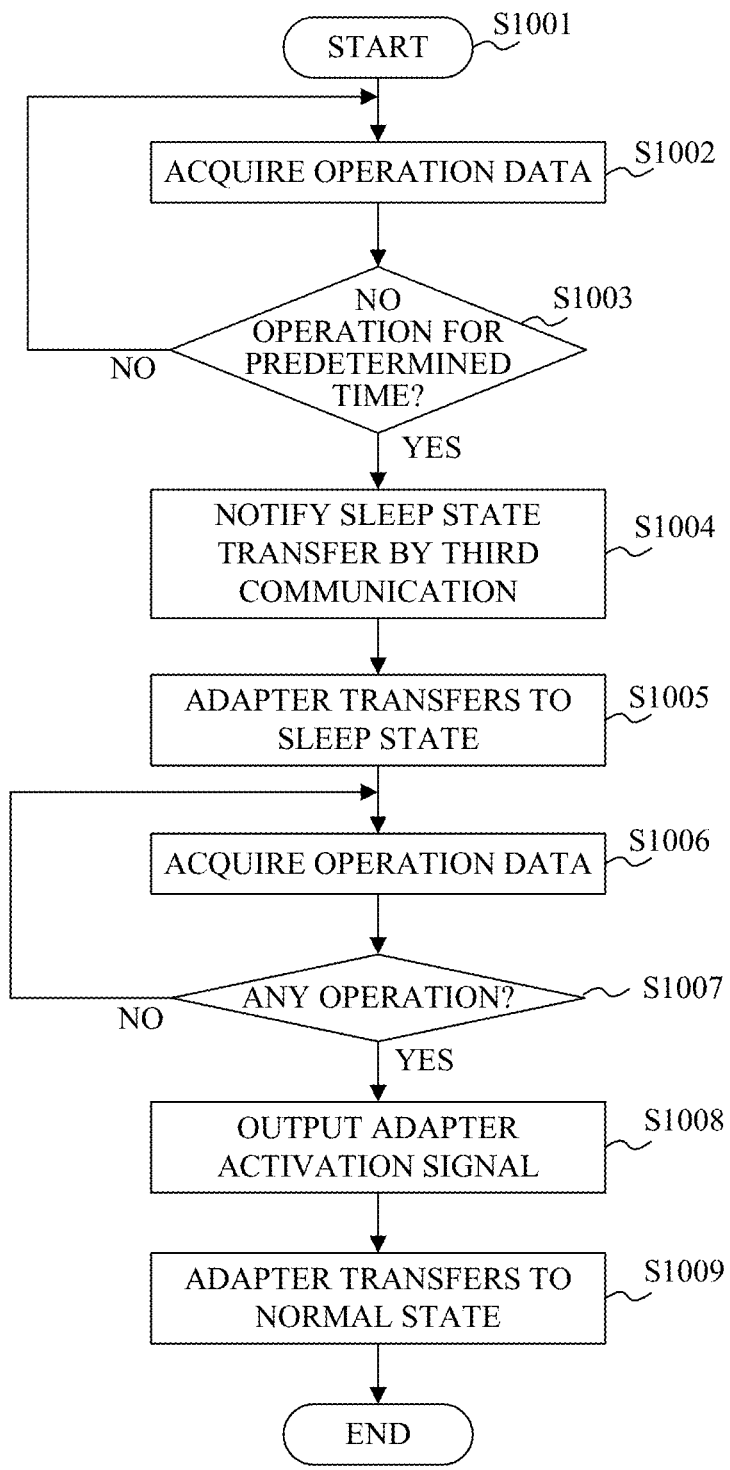
FIG. 10 is a flowchart illustrating adapter control processing according to the second embodiment.

Referring now to a flowchart in FIG. 10, a description will be given of processing in which the camera 20' transfers the adapters 30' and 40' from the normal state to the sleep state and again transfers the adapters 30' and 40' to the normal state. The normal state of the adapters 30' and 40' is a state in which the adapters 30' and 40' can perform the third communication and the camera 20' can control driving of the movable optical element of the imaging optical system of the interchangeable lens 10'. The sleep state of the adapters 30' and 40' indicates a state where the adapters 30' and 40' stop the third communication and consume the power lower than that in the normal state.

In the step S1002, the camera controller 2201 that has started the process in S1001 acquires the camera operation data and the lens operation data described in the first embodiment. Then, the flow proceeds to S1003.

In S1003, the camera controller 2201 determines whether or not the time during which the camera operation data or the lens operation data has not changed exceeds a predetermined time. In other words, it is determined whether or not the non-operation time during which the operation members 207 and 118 of the camera 20' or the interchangeable lens 10' are not operated by the user exceeds the predetermined time. If the non-operation time exceeds the predetermined time, the camera controller 2201 proceeds to S1004, and if not (if there is an operation), the camera controller 2201 repeats the processing of S1003. The predetermined time is time enough to determine that the user is not performing an operation for imaging, such as several seconds.

In S1004, the camera controller 2201 transmits a command requesting the adapter controllers 2301 and 2401 to transfer to the sleep state via the third camera communicator 209 (and the third adapter communicators 310 and 410). Then, the flow proceeds to S1005.

In S1005, the adapter controllers 2301 and 2401 cause the adapters 30' and 40' to transfer to the sleep state, respectively. Only the adapter sleep state signal controllers 2302 and 2402 operate in the adapters 30' and 40' in the sleep state.

In the step S1006, the camera controller 2201 acquires the camera operation data and lens operation data again. Then, the flow proceeds to S1007.

In S1007, the camera controller 2201 determines whether there is a change in the camera operation data or the lens operation data acquired in S1002 and S1006. In other words, it is determined whether or not the operation members 207 and 118 of the camera 20' or the interchangeable lens' are operated by the user. If the camera controller 2201 determines that the operation has been performed, the flow proceeds to step S1008; otherwise (if there is no operation), the determination in the step S1007 is repeated.

In S1008, the camera controller 2201 outputs an adapter activation signal to the third communication channel 300 via the camera sleep state signal controller 2202. The processing of outputting the adapter activation signal to the third communication channel 300 is the same as the processing of outputting the lens activation signal to the first communication channel 100 described above.

Next, in S1009, the adapter sleep state signal controllers 2302 and 2402 activate the adapter controllers 2301 and 2401, respectively, and cause the adapters 30' and 40' to transfer to the normal state. Then, this processing ends.

This processing allows the camera controller 2201 to shift only the adapters 30' and 40' from the normal state to the sleep state, and from the sleep state to the normal state.

Further, the processing of transferring the adapters 30' and 40' from the sleep state to the normal state according to the operation of the adapter operation members 312 and 412 is similar to the method for transferring the interchangeable lens 10' to the normal state according to the operation of the lens operation member 118 described above. In other words, in response to the operation of the adapter operation members 312 and 412 of the adapters 30' and 40' in the sleep state, the adapter activation request signal is transmitted to the camera 20' using the third communication channel 300. Then, the adapter activation signal is transmitted from the camera 20' to the adapters 30' and 40' using the third communication channel 300. Thereby, only the adapters 30' and 40' can be transferred from the sleep state to the normal state.

According to this embodiment, the camera 20' can transfer the interchangeable lens 10' and the adapters 30' and 40' to the normal state and the sleep state without depending on their states. Hence, a proper power control can be performed according to the use situations and types of the interchangeable lens and the adapter. For example, when the camera 20' is driven by a battery and the camera 20' detects that the battery power has lowered, only the adapter can be put into a sleep state, thereby making the camera imaging time as long as possible.

The embodiment described above has described two adapters arranged between the interchangeable lens 10 and the camera 20, but the number of adapters is not limited to this embodiment. The present invention is applicable to an interchangeable lens, a camera, and an adapter constituting a camera system in which at least one adapter can be disposed between the interchangeable lens 10 and the camera 20.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The present invention can realize a camera, an interchangeable lens apparatus, and an adapter apparatus, each of which can expedite a communication between the camera and the interchangeable lens apparatus and smooth a communication between the camera and the adapter apparatus.

The embodiments described above are merely representative examples, and various modifications and changes may be made to the embodiments when the present invention is implemented.

What is claimed is:

1. A camera to which an interchangeable lens apparatus is connected via at least one adapter apparatus, the camera comprising:
   a lens-camera communication controller configured to communicate with the interchangeable lens apparatus via a camera-lens communication channel connected from the camera to the interchangeable lens apparatus via the adapter apparatus; and
   an adapter-camera communication controller configured to communicate with the adapter apparatus via a camera-adapter communication channel provided separately from the camera-lens communication channel with the adapter apparatus,
   wherein the camera-lens communication channel includes a first data communication channel used during a data communication and a first notification channel used for a notification of a timing of a communication via the first data communication channel, and
   wherein the camera-adapter communication channel includes a second data communication channel used during the data communication and a second notification channel used for a notification of a timing of a communication via the second data communication channel.

2. The camera according to claim 1, wherein the lens-camera communication controller performs the communication regardless of whether the adapter-camera communication controller is communicating or not.

3. The camera according to claim 1, wherein the communication via the lens-camera communication channel and the communication via the adapter-camera communication channel are different from each other in at least one of communication method, communication timing, communication rate and communication voltage.

4. The camera according to claim 1, wherein the lens-camera communication controller transmits a lens control command for controlling an operation of the interchangeable lens apparatus, to the interchangeable lens apparatus.

5. The camera according to claim 1, wherein the adapter-camera communication controller receives unique information of the adapter apparatus from the adapter apparatus.

6. The camera according to claim 5, wherein the unique information includes optical data of the adapter apparatus.

7. The camera according to claim 1, wherein the adapter-camera communication controller receives operation data indicating a user operation for the adapter apparatus, from the adapter apparatus.

8. The camera according to claim 1, wherein the lens-camera communication controller detects a communication voltage used by the interchangeable lens apparatus in the camera-lens communication channel, and sets the communication voltage to be used for the communication with the interchangeable lens apparatus in the camera-lens communication channel according to a result of the detection.

9. The camera according to claim 1, wherein the adapter-camera communication controller receives data relating to the interchangeable lens apparatus from the interchangeable lens apparatus via the camera-adapter communication channel.

10. The camera according to claim 1, wherein each of the lens-camera communication controller and the adapter-camera communication controller individually performs a communication to transfer the interchangeable lens apparatus and the adapter apparatus from a first state in which the communication is performed to a second state in which no communication is performed.

11. The camera according to claim 10, wherein the lens-camera communication controller transmits a lens activation signal for transferring the interchangeable lens apparatus from the second state to the first state, or a lens activation requesting signal for requesting the second state of the interchangeable lens apparatus output from the interchangeable lens apparatus to the first state, via the camera-lens communication channel, by a communication method different from the communication in the first state.

12. The camera according to claim 10, wherein the adapter-camera communication controller transmits an adapter activation signal for transferring the adapter apparatus from the second state to the first state, or an adapter activation requesting signal for requesting the second state of the adapter apparatus output from the adapter apparatus to the first state, via the camera-adapter communication channel, by a communication method different from the communication in the first state.

13. The camera according to claim 1, wherein the adapter-camera communication controller is configured to switch between a first communication method used to communicate among the interchangeable lens apparatus, the at least one adapter apparatus, and the camera, and a second communication method used to individually communicate with either the interchangeable lens apparatus or the at least one adapter apparatus and different from the first communication method in voltage level of the second notification channel while transmitting data to a communication counterpart.

14. The camera according to claim 13, wherein the adapter-camera communication controller sets the voltage level of the second notification channel during a data transmission in the first communication method to a first level, and sets the voltage level of the second notification channel during a data transmission in the second communication method to a second level higher than the first level.

15. The camera according to claim 13, wherein the adapter-camera communication controller transmits, via the second data communication channel in the first communication method, communication counterpart designation data indicating a communication counterpart of the camera in the second communication method.

16. A camera system comprising:
   the camera according to claim 1;
   an interchangeable lens apparatus connected to the camera; and
   an adapter apparatus connected to the camera and the interchangeable lens apparatus.

17. An adapter apparatus to which the camera and interchangeable lens apparatus are connected, the adapter apparatus comprising:
   a relay channel for forming part of a camera-lens communication channel used for a communication between the camera and the interchangeable lens apparatus; and
   an adapter-camera communication controller configured to communicate with the camera via a camera-adapter communication channel provided separately from the relay channel with the camera, wherein the camera-lens communication channel includes a first data communication channel used during a data communication and a first notification channel used for a notification of a timing of a communication via the first data communication channel, and wherein the camera-adapter communication channel includes a second data communication channel used during a data communication and a second notification channel used for a notification of a timing of a communication via the second data communication channel.

18. An interchangeable lens apparatus connected to an adapter apparatus and a camera via the adapter apparatus, the interchangeable lens apparatus comprising:

a first lens-camera communication controller configured to communicate with the camera via a camera-lens communication channel connected to the interchangeable lens apparatus from the camera via the adapter apparatus; and a second lens-camera communication controller provided separately from the camera-lens communication channel and configured to communicate with the camera via a communication channel including a camera adapter communication channel connected to the camera and the adapter, wherein the first camera-lens communication channel includes a first data communication channel used during a data communication and a first notification channel used for a notification of a timing of communication via the first data communication channel, and wherein the communication channel includes the camera-adapter communication channel includes a second data communication channel used during a data communication and a second notification channel used for a notification of a timing of a communication via the second data communication channel.

19. A control method for a camera connected to an interchangeable lens apparatus via at least one adapter apparatus, the control method comprising the steps of:

communicating with the interchangeable lens apparatus via a camera-lens communication channel connected from the camera to the interchangeable lens apparatus via the adapter apparatus, and communicating with the adapter apparatus via a camera-adapter communication channel from a camera-lens communication channel with the adapter apparatus separate; and controlling an operation of the interchangeable lens apparatus using data obtained through a communication with the interchangeable lens apparatus, and controlling an operation of the adapter apparatus using data obtained through a communication with the adapter apparatus, wherein the camera-lens communication channel includes a first data communication channel used during a data communication and a first notification channel used for a notification of a timing of a communication via the first data communication channel, and wherein the camera-adapter communication channel includes a second data communication channel used during a data communication and a second notification channel used for a notification of a timing of communication via the second data communication channel.

20. A non-transitory computer-readable storage medium storing a computer program for causing a computer in a camera connected to an interchangeable lens apparatus via at least one adapter apparatus, to execute processing, wherein the processing includes:

processing of communicating with the interchangeable lens apparatus via a camera-lens communication channel connected from the camera to the interchangeable lens apparatus via the adapter apparatus, and of communicating with the adapter apparatus via a camera-adapter communication channel from a camera-lens communication channel with the adapter apparatus separate; and processing of controlling an operation of the interchangeable lens apparatus using data obtained through a communication with the interchangeable lens apparatus, and of controlling an operation of the adapter apparatus using data obtained through a communication with the adapter apparatus, wherein the camera-lens communication channel includes a first data communication channel used during a data communication and a first notification channel used for a notification of a timing of a communication via the first data communication channel, and wherein the camera-adapter communication channel includes a second data communication channel used during a data communication and a second notification channel used for a notification of a timing of communication via the second data communication channel.

* * * * *